United States Patent
Hamano et al.

(10) Patent No.: US 9,445,036 B2
(45) Date of Patent: Sep. 13, 2016

(54) METHODS AND SYSTEMS FOR CONTENT SCHEDULING ACROSS MULTIPLE DEVICES

(75) Inventors: Royce Hamano, Los Angeles, CA (US); Camron Shimy, Canyon County, CA (US); Christopher Strader, Valencia, CA (US)

(73) Assignee: Rovi Guides, Inc., San Carlos, CA (US)

( * ) Notice: Subject to any disclaimer, the term of this patent is extended or adjusted under 35 U.S.C. 154(b) by 166 days.

(21) Appl. No.: 12/495,622

(22) Filed: Jun. 30, 2009

(65) Prior Publication Data

US 2010/0333137 A1    Dec. 30, 2010

(51) Int. Cl.

| | |
|---|---|
| *H04N 5/445* | (2011.01) |
| *H04H 60/46* | (2008.01) |
| *H04L 12/40* | (2006.01) |
| *H04N 7/173* | (2011.01) |
| *H04N 21/45* | (2011.01) |
| *H04N 21/458* | (2011.01) |
| *H04N 21/472* | (2011.01) |
| *H04N 21/475* | (2011.01) |
| *H04N 21/482* | (2011.01) |

(52) U.S. Cl.
CPC .......... *H04N 5/44543* (2013.01); *H04H 60/46* (2013.01); *H04L 12/40013* (2013.01); *H04N 7/17318* (2013.01); *H04N 21/458* (2013.01); *H04N 21/4532* (2013.01); *H04N 21/4753* (2013.01); *H04N 21/47202* (2013.01); *H04N 21/4821* (2013.01); *H04N 21/4826* (2013.01)

(58) Field of Classification Search
None
See application file for complete search history.

(56) References Cited

U.S. PATENT DOCUMENTS

| | | |
|---|---|---|
| 6,288,716 B1 | 9/2001 | Humpleman et al. |
| 7,165,098 B1 | 1/2007 | Boyer et al. |
| 2002/0087972 A1* | 7/2002 | Cragun .............. H04N 7/17318 725/32 |
| 2003/0159145 A1* | 8/2003 | Kaltz ............................... 725/46 |
| 2004/0003392 A1* | 1/2004 | Trajkovic et al. .............. 725/10 |
| 2005/0028208 A1 | 2/2005 | Ellis et al. |
| 2006/0015906 A1 | 1/2006 | Boyer et al. |
| 2007/0074269 A1* | 3/2007 | Hua ............................ 725/151 |
| 2007/0101185 A1 | 5/2007 | Ostrowka |
| 2008/0059884 A1 | 3/2008 | Ellis |
| 2008/0066106 A1 | 3/2008 | Ellis |
| 2008/0235731 A1* | 9/2008 | Bryant et al. ................... 725/44 |
| 2010/0131996 A1* | 5/2010 | Gauld ............................ 725/100 |
| 2011/0283328 A1* | 11/2011 | Davis ............... H04M 1/72533 725/62 |

FOREIGN PATENT DOCUMENTS

| | | |
|---|---|---|
| EP | 1677538 A1 | 7/2006 |
| JP | 2005/503693 | 2/2005 |
| JP | 2006-229707 | 8/2006 |
| JP | 2003-274377 | 9/2008 |
| WO | WO-0143424 A1 | 6/2001 |
| WO | WO-0178383 A2 | 10/2001 |

(Continued)

*Primary Examiner* — Mark D Featherstone
(74) *Attorney, Agent, or Firm* — Ropes & Gray LLP

(57) ABSTRACT

Methods and systems for scheduling media content presentation across multiple devices are disclosed. A media planner application generates media event presentation schedules for one or more users based on user-scheduled media events and automatic media event recommendations. Media events can be scheduled for presentation on multiple user devices, including portable devices. Media event recommendations can be generated based at least in part on user preferences and habits, such as user media preferences, device availability, device usage, device connectivity, and user mood.

42 Claims, 16 Drawing Sheets

(56) References Cited

FOREIGN PATENT DOCUMENTS

| WO | WO 2005/036880 | 4/2005 | | |
|----|----|----|----|----|
| WO | WO 2005094068 A1 | 10/2005 | | |
| WO | WO 2008042242 A2 * | 4/2008 | ............ | H04N 7/173 |
| WO | WO-2008042242 A2 | 4/2008 | | |
| WO | WO 2008/118292 | 10/2008 | | |

* cited by examiner

500

| Friday | 12:44pm | |
| --- | --- | --- |
| March 31, 2006 | | |
| The Simpsons | 2 FOX | |
| 7-7:30 pm | TV-14 | |
| "Kamp Krusty", Repeat, (1992) | | |

| | 7:00 pm | 7:30 pm | 8:00 pm |
| --- | --- | --- | --- |
| 2 FOX | The Simpsons | King of the Hill | Joe Millionaire |
| 3 ABC | The Bourne Identity | | |
| 5 HBO (VOD) | HBO On Demand | | |
| Recorded | Display Recorded Program Listings | | |
| CNN.com | Access CNN.com Video Content | | |
| Bob's Schedule | Rachmaninoff Collected Works (aud1) (audio) | King of the Hill ★ (tv1) (br, rec) | The Office (pc1) (web) |

ADVERTISEMENT

FIG. 5

| Start Time / End Time | Program ID | Format | Action | Device | Content Source | Schedule Source |
|---|---|---|---|---|---|---|
| Jun-04-2009 10:00AM / Jun-04-2009 11:00AM | Title 1 / ID 1 | aud (stereo) | stream | pc2 | provider1 | user |
| Jun-04-2009 10:00AM / Jun-04-2009 11:00AM | Title 2 / ID 2 | vid (HD) | record | rec1 | provider2 | user |
| Jun-04-2009 11:00AM / Jun-04-2009 11:30AM | Title 3 / ID 3 | aud (stereo) | stream | pc2 | provider1 | rec (sys) |
| Jun-04-2009 11:30AM / Jun-04-2009 12:00N | Title 4 / ID 4 | vid (HD) | stream | pc2 | provider3 | rec (ext) |
| Jun-04-2009 12:00N / Jun-04-2009 1:00PM | Title 5 / ID 5 | vid (H.264) | preload | port1 | local | user |
| Jun-04-2009 12:00N / Jun-04-2009 1:00PM | Title 6 / ID 6 | aud (stereo) | record | rec2 | provider1 | user |
| Jun-04-2009 1:00PM / Jun-04-2009 1:30PM | Title 7 / ID 7 | aud (stereo) | stream | pc2 | home | rec (ext) |
| Jun-04-2009 1:30PM / Jun-04-2009 2:00PM | Title 8 / ID 8 | aud (stereo) | preload | pc2 | local | user |

| | | | | | | | | |
|---|---|---|---|---|---|---|---|---|
| ▨ | ▨ | ▨ | ▨ | ▨ | ▨ | ▨ | | 11 PM |
| ▨ | ▨ | ▨ | ▨ | ▨ | ▨ | ▨ | | 10 PM |
| ▨ | ▨ | ▨ | ▨ | ▨ | ▨ | ▨ | | 9 PM |
| ▨ | ▨ | ▨ | ▨ | ▨ | ▨ | ▨ | | 8 PM |
| ▨ | ▨ | ▨ | ▨ | ▨ | ▨ | ▨ | | 7 PM |
| | | | | ▨ | ▨ | | ▨ | 6 PM |
| | | | | ▨ | ▨ | | ▨ | 5 PM |
| | | | | ▨ | ▨ | | ▨ | 4 PM |
| | | | | ▨ | ▨ | | | 3 PM |
| | | | | ▨ | ▨ | | | 2 PM |
| | | | | ▨ | ▨ | | | 1 PM |
| | | | | ▨ | ▨ | | | 12 N |
| | | | | ▨ | ▨ | ▨ | | 11 AM |
| | | | | ▨ | ▨ | ▨ | | 10 AM |
| | | | | ▨ | | | ▨ | 9 AM |
| ▨ | ▨ | ▨ | ▨ | ▨ | ▨ | | | 8 AM |
| ▨ | ▨ | ▨ | ▨ | ▨ | ▨ | | | 7 AM |
| ▨ | ▨ | ▨ | ▨ | ▨ | ▨ | | | 6 AM |
| TV (living room) | TV (bedroom) | Audio (kitchen) | Computer (home office) | Portable media player | Cell phone | Laptop computer | Car audio system | |

|  | Video (SD) | Video (HD) | Video (H.264) | Audio (stereo) | Audio (surround) |
|---|---|---|---|---|---|
| TV (living room) | X | X |  | X | X |
| TV (bedroom) | X |  |  | X |  |
| Audio (kitchen) |  |  |  | X |  |
| Computer (home office) | X | X | X | X | X |
| Portable media player |  |  | X | X |  |
| Cell phone |  |  | X | X |  |
| Laptop computer | X | X | X | X |  |
| Car audio system |  |  |  | X | X |

1300

FIG. 13

METHODS AND SYSTEMS FOR CONTENT SCHEDULING ACROSS MULTIPLE DEVICES

BACKGROUND

This invention relates generally to media systems, and more particularly, to media systems that provide media content scheduling.

An interactive media guidance application allows a user to more easily navigate through a wide variety of media content accessible by the user equipment. The accessible media content may include hundreds of digital broadcast television channels, interactive applications (e.g., interactive games), digital music, on-demand programming (e.g., video-on-demand (VOD) programming), Internet resources, and recorded content (e.g., content recorded to a local video recorder).

An interactive media guidance application may also perform other media guidance application functions. These functions may include, for example, searching for media events, scheduling reminders for a user to view or record media events, or any other function.

Recently, portable media content delivery devices such as portable music players, video players, and video game systems have become popular. Interactive media guidance applications have traditionally been designed to facilitate media delivery scheduling with stationary user devices (e.g., set-top boxes and televisions), and have generally not considered or supported portable media content delivery devices or media delivery scheduling across multiple devices of a user.

Furthermore, traditional interactive media guidance application functions such as content searching and scheduling have typically been performed responsive to user input. That is, the user typically has to conduct a search for content or schedule a particular media event for viewing or recording. Support for automatically generating and scheduling recommended media viewing across multiple devices for a user has been limited.

SUMMARY OF THE INVENTION

In view of the foregoing, systems and methods for providing media planner guidance applications are provided. According to one aspect of the invention, a method for scheduling media content presentation across multiple user devices is disclosed. User profile information may be received and the received user profile information may be stored in a memory. A first user-scheduled media event may be scheduled, a second system-scheduled media event may be scheduled, a list of scheduled media events may be displayed, the list including the first and second media events. User input may be received to change the schedule information associated with at least one of the first media event and the second media event.

According to another aspect of the invention, a method for scheduling media content presentation across multiple user devices is disclosed. User profile information may be received and stored in a memory. A first media content event may be scheduled to be presented from a first user device at a first timeslot based at least in part on the user profile information, and a second media content event may be scheduled to be presented from a second user device at a second timeslot based at least in part on the user profile information. The first media event may be presented to a user from the first user device at the first timeslot and the second media content event may be presented to the user from the second user device at the second timeslot.

According to yet another aspect of the invention, a system for scheduling media content presentation across multiple user devices is disclosed. This system may include a user input interface, a display, and control circuitry. The control circuitry may include a memory and processing circuitry. The processing circuitry may be configured to receive user profile information from the user input interface and store the received user profile information in the memory. The processing circuitry may also be configured to schedule a first user-scheduled media event, schedule a second system-scheduled media event, display, via the display, a list of scheduled media events including the first and second media events, and receive user input via the user input interface to change the second media event.

According to another aspect of the invention, a system for scheduling media content presentation across multiple user devices is disclosed. This system may include a user input interface, a display, and control circuitry. The control circuitry may include a memory and processing circuitry. The processing circuitry may be configured to receive user profile information from the user input interface and store the received user profile information in the memory. The processing circuitry may also be configured to schedule a first media content event to be presented on a first user device during a first timeslot based at least in part on the user profile information and schedule a second media content event to be presented on a second user device during a second timeslot based at least in part on the user profile information. The processing circuitry may also be configured to present the first media event to a user on the first user device during the first timeslot and present the second media content event to the user on the second user device during the second timeslot. Media associated with the media events may be transcoded to a supported format to be presented on the first user device and/or the second user device.

In some embodiments, at least one of the first and second user devices may be portable media players. In some embodiments, receiving profile information may include automatically monitoring user habits and preferences. Optionally, user profile information may include a device availability sub-profile, a device connectivity sub-profile, a device usage sub-profile, and/or a user mood sub-profile. According to some embodiments, the processing circuitry may be further configured to provide media content event recommendations based on the device availability sub-profile, the device connectivity sub-profile, the device usage sub-profile, and/or the user mood sub-profile. In some embodiments, the processing circuitry may be further configured to determine when the first user device will be connected and schedule the delivery of the first media content event to the first user device based at least in part on the determining.

According to some embodiments, the processing circuitry may be further configured to generate a media content event recommendations list based at least in part on external, non-user sources. In certain embodiments, external, non-user sources may include web logs, online forums, news websites, review websites, and/or social networking websites. In some of the above embodiments, the first media content event may be a video media content event and the second media content event may be a non-video media content event. In some embodiments, the method may further include or the processing circuitry may be further configured to present advertisements based on the user profile information, update the stored user profile information based on user interactions with one of the first and second user devices, and/or update the stored user profile information based on automatically monitoring user habits, preferences, and/or interactions.

BRIEF DESCRIPTION OF THE FIGURES

The invention may be better understood from the following illustrative description, taken in conjunction with the accompanying drawings in which:

FIG. 5 shows an illustrative example of a media planner schedule displayed with grid program listings, according to an illustrative embodiment of the invention;

FIG. 9 depicts an illustrative example of a relational database table for storing media planner schedule information, according to an illustrative embodiment of the invention;

FIG. 11 depicts an illustrative example of a device accessibility sub-profile, according to an illustrative embodiment of the invention;

FIG. 13 depicts an illustrative example of a device format compatibility table, according to an illustrative embodiment of the invention;

DETAILED DESCRIPTION OF EMBODIMENTS

Figure 1:
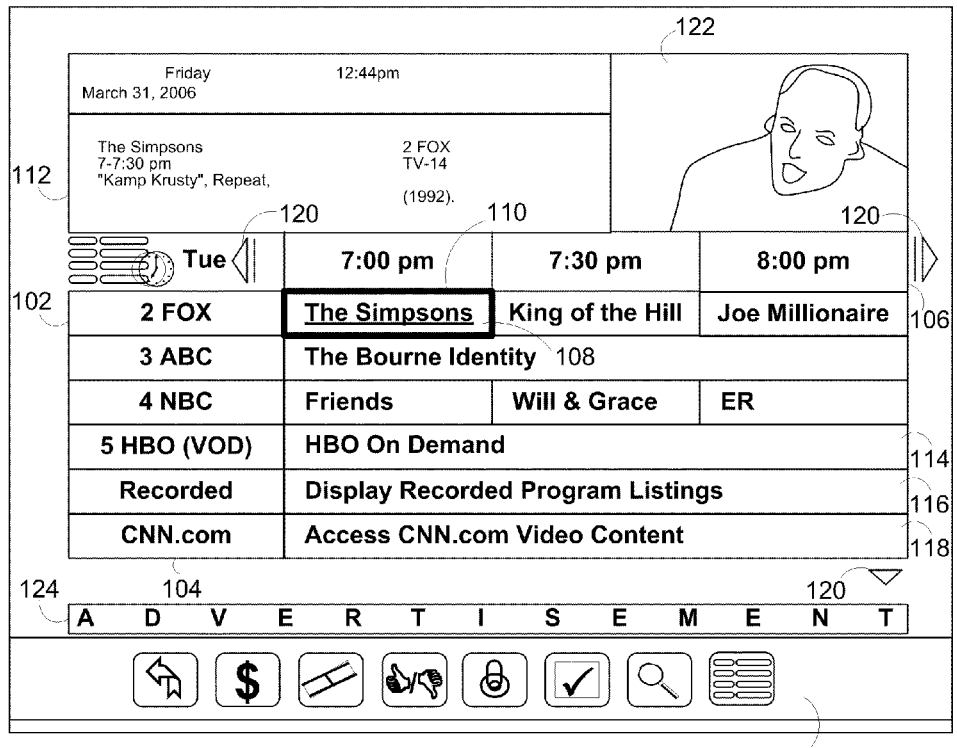
FIG. 1 shows an illustrative grid program listings display, according to an illustrative embodiment of the invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a website), or as stand-alone applications or clients on hand-held computers, PDAs, mobile telephones, or other mobile devices. The various devices and platforms that may implement media guidance applications are described in more detail below.

One of the functions of the media guidance application is to provide media listings and media information to users. FIGS. 1-2 and 5-7 show illustrative display screens that may be used to provide media guidance, and in particular media listings. The display screens shown in FIGS. 1-2 and 5-7 may be implemented on any suitable device or platform. While the displays of FIGS. 1-2 and 5-7 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. Publication No. 2003/0110499, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIGS. 4 and 5-18. Additional personalized media guidance application features are described in greater detail in Ellis et al., U.S. Publication No. 2005/0251827, Boyer et al., U.S. Pat. No. 7,165,098, and Ellis et al., U.S. Publication No. 2002/0174430, which are all hereby incorporated by reference herein in their entireties.

Figure 2:
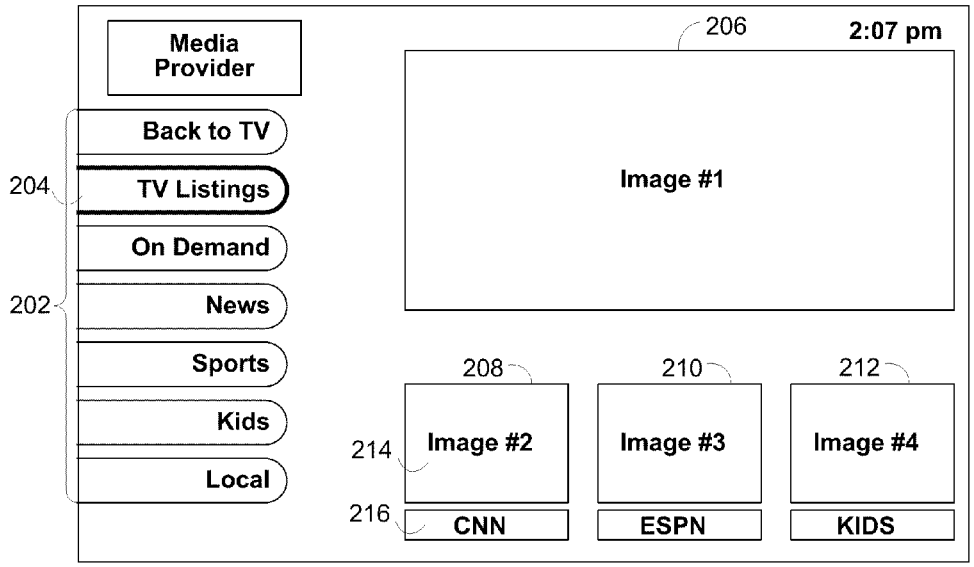
FIG. 2 shows an illustrative video mosaic display for providing media guidance, according to an illustrative embodiment of the invention.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
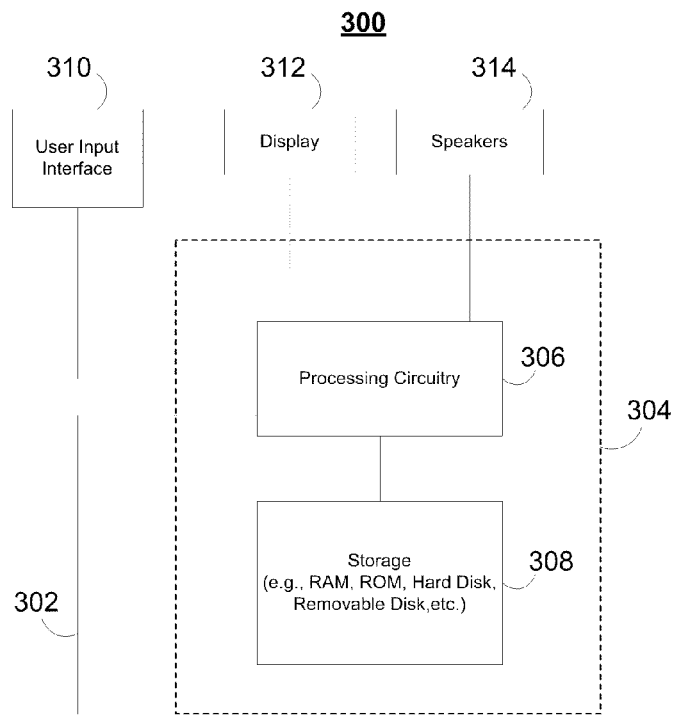
FIG. 3 shows a generalized embodiment of a user equipment device, according to an illustrative embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304.

Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Non-volatile memory may also be used (e.g., to launch a boot-up routine and other instructions).

Storage 308 may also store user-created and system-generated viewing schedules. For example, one or more media events may be associated with a user-defined or system-recommended viewing time slot. These viewing schedules may be stored, for example to a table in a relational database in storage 308, such as table 900 shown in FIG. 9. Access to view or modify a viewing schedule may be limited or restricted to the user creating the schedule (and other authorized users) or all users may view and/or edit viewing schedules in some embodiments. Permissions and access restrictions to viewing schedules may be defined by the user or by the system.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
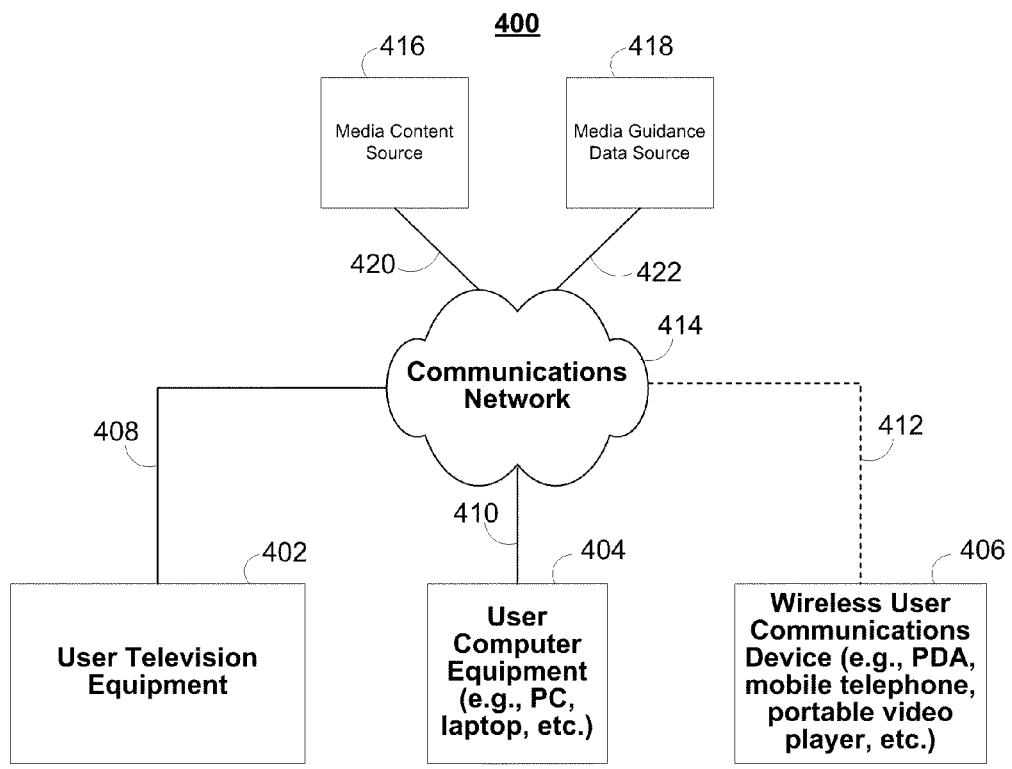
FIG. 4 shows a generalized embodiment of a media provider and guidance system, according to an illustrative embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a stand-alone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets). Moreover, one or more user equipment devices may be available in multiple locations. For example, in a particular household, a large-format television display may be located in the living room, a smaller television display may be located in the bedroom, an audio system may be located in the kitchen, and one or more personal computers may be located in the home office.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Publication No. 2005/0028208, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, a media planner media guidance application is disclosed. The media planner application may be used to create a media event schedule for one or more users of a media system (e.g. system 400 of FIG. 4). A media event schedule may comprise a list of media or media events that a user is scheduled to view, listen to, or otherwise consume. Consuming media in the context of this application may include any interaction with or presentation of media, media events, or media content. The media and media events may be manually scheduled by a user (i.e. user-scheduled events) or automatically scheduled by the media planner guidance application on behalf of the user (i.e. planner-recommended events). Media event schedules may be stored in storage 308 (FIG. 3) in some embodiments. For example, each user of the media system may be associated with a table in a relational database that stores all media scheduled for that user.

Media events may also include reminders for broadcast programs and/or programs that have been selected or recommended for recording. In some embodiments, this list of media and/or media events may be directly tied to a schedule or a calendar. In such embodiments, specific media or media events may be associated with specific timeslots. The association may be based at least in part on the media or media events themselves (for example, a broadcast program may be associated with the timeslot corresponding to its broadcast time), on user preference (for example, a user may want to schedule viewing of a particular type of media at a particular time, such as an action movie in the evenings), or on other events. For example, a group of friends may all want to schedule viewing of a particular piece of content at a certain time. In some embodiments, a timeslot may be associated with media and/or media events automatically by the media planner application, based at least in part on one or more user profiles, which are described in further detail below. In certain embodiments, the media planner schedule may be displayed simultaneously with broadcast, on-demand, and/or pay-per-view program listings to allow the user to select programs that do not conflict with already-scheduled media events.

FIG. 5 shows an illustrative example of a media planner schedule 130 displayed with grid program listings. Scheduled media events such as media events 132 and 134 may list the identity of the media event, as well as indicate the content type (e.g., audio) or source (e.g., "br" for broadcast, "web" for internet) of the event. The media event may also include one or more indicators as to whether it is to be recorded (e.g., "rec" indicator), whether it is a favorite (indicator 136), or the device it will be presented on (indicator 138). These indicators may take the form of graphics, text, shading, color, and/or a combination of the above. Indicators may be selectable by the user in some embodiments. For example, a user may select indicator 138 to manually change the presentation device or presentation content format for event 134. In some embodiments, user-scheduled media events may be distinguished from media planner-recommended media events in a similar fashion. For example, media event 132, recommended by the media planner, may be shaded differently from media event 134, specifically scheduled by the user. The user may be able to navigate highlight region 110 to media planner schedule 130 in order to highlight and/or select a scheduled media event. For example, the user may be able to navigate highlight region 110 to media event 132. Once media event 132 is selected, program information region 112 may display additional information related to media event 132. In some embodiments, the user may then actuate a button or select an onscreen option to be presented with an options screen related to the selected media event or to the media planner application.

In some embodiments, the media planner schedule may be displayed simultaneously with other electronic planners and/or calendars. For example, the media planner schedule may be displayed simultaneously with a user's personal online calendar. To generate the simultaneous display, the media planner application may be configured to retrieve data directly from the user's personal calendar system. In some embodiments, the media planner application may be configured to export media planner schedule information to another calendaring application or system. For example, the media planner application may interface with a user's Microsoft Outlook© calendar system.

Figure 6:
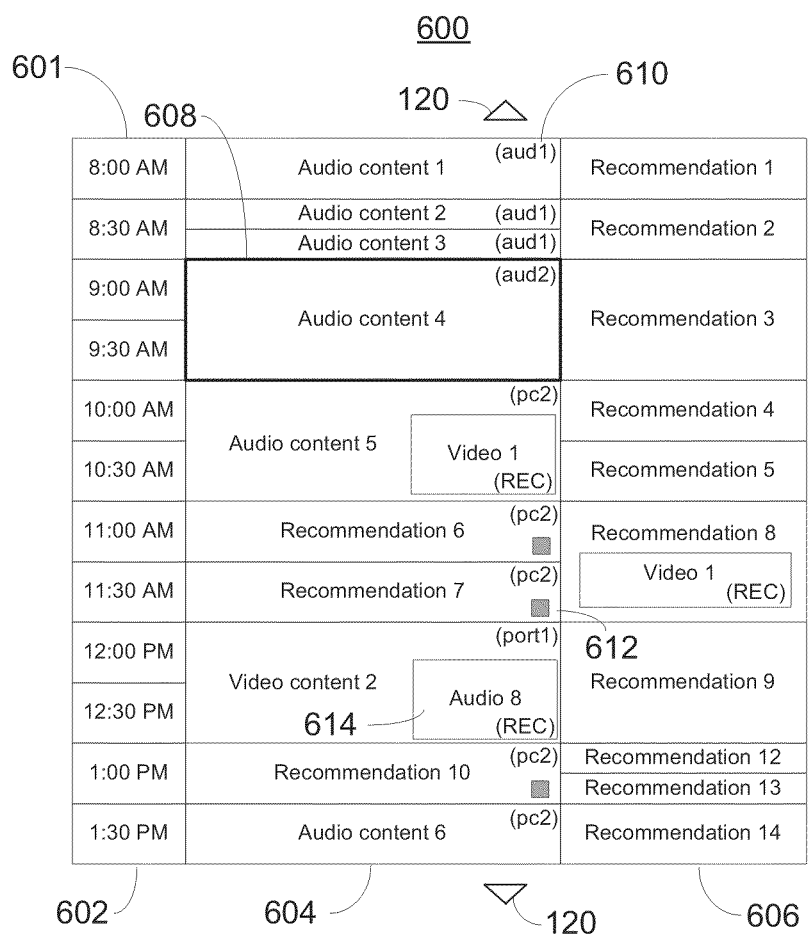
FIG. 6 shows an illustrative example of a media planner daily schedule display, according to an illustrative embodiment of the invention.

The media planner schedule may be viewed in daily, weekly, or monthly formats. Media planner schedules may be interactive or non-interactive. FIG. 6 shows illustrative media planner daily schedule display 600. Schedule display 600 may include grid 601 with a column of time identifiers 602, a column of scheduled media events 604, and a column of recommendations 606. Each scheduled media event in column 604 may be associated with at least one time identifier, and may be associated with at least one recommendation from column 606. Each scheduled media event may also be associated with a source indicator 610 or an automatic schedule indicator 612. Source indicator 610 indicates the particular device that the media event will be presented from, such as an audio system (aud1), a computer (pc2), or a portable media player (port1). Automatic schedule indicator 612 indicates that the associated media event was automatically scheduled by the media planner (e.g. as opposed to being manually scheduled by the user). Indicators 610 and 612 may take the form of graphics, text, shading, color, and/or a combination of the foregoing.

In some embodiments, all schedule timeslots for the entire day are not simultaneously displayed to the user. In such embodiments, navigation cursors 120 may be used to navigate to different timeslots. In some embodiments, all schedule timeslots for the entire day may be displayed simultaneously to the user.

In some embodiments, a media event may be scheduled to be presented to a user while another media event is to be simultaneously recorded. Secondary media event indicators, such as indicator 614, may be used to indicate that while a particular media event is scheduled for presentation, another media event is scheduled to be recorded.

Figure 7:
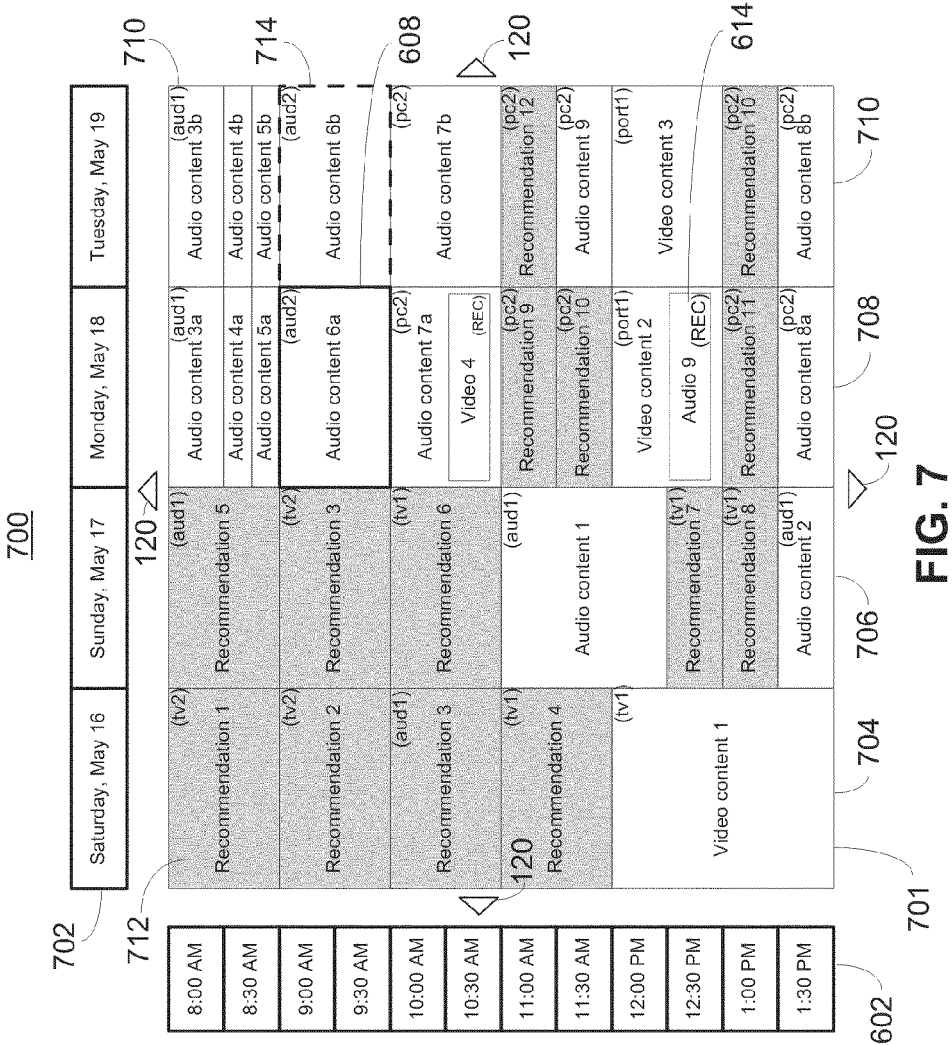
FIG. 7 shows an illustrative example of a media planner weekly schedule display, according to an illustrative embodiment of the invention.

FIG. 7 shows illustrative media planner weekly schedule display 700. Weekly schedule display 700 is similar to daily schedule display 600, but allows the user to view the schedules for multiple days. Each day may be represented by a column in grid 701 (704, 706, 708, 710). Date bar 702 contains a row of date identifiers. In some embodiments, as with daily schedule display 600, all schedule timeslots for an entire day and/or the entire week are not simultaneously displayed to the user. In these embodiments, navigation cursors 120 may be used to navigate to different timeslots and different days. In some embodiments, all schedule timeslots for an entire day or an entire week may be displayed simultaneously to the user.

In weekly schedule display 700, an automatically scheduled media event such as event 712 is indicated by a different background color. However, as with daily schedule display 600, automatically scheduled media events may be indicated by different graphics, text, shading, colors, and/or a combination of the foregoing.

In some embodiments, when a user places highlight region 608 over a scheduled media event, the media planner application may automatically highlight related scheduled media events. In weekly schedule display 700, the media event labeled "Audio content 6a" is indicated by highlight region 608. "Audio content 6b", which is related to "Audio content 6a", may be highlighted by a secondary highlight indicator 714. In some embodiments, the secondary highlight indicator 714 may be differentiated from highlight region 608 by, for example, different graphics, text, shading, colors, and/or a combination of the foregoing.

User profiles may be used by the media planner application to schedule content consumption (e.g. viewing, recording, listening, etc.) and/or recommend media events to one or more users. User profiles may contain different types of information or sub-profiles, oriented to a particular aspect of user preferences or activities, such as viewing habits and likes or dislikes.

In some embodiments, the media planner schedule information may be stored in a relational database table. FIG. 9 shows illustrative relational database table 900, with each row corresponding to a media event entry and each column corresponding to a parameter associated with a media event. Relational database table 900 may be stored in storage 308 (FIG. 3) or on a network storage device. In some embodiments, each media event in a media planner schedule may be represented by a single row entry in table 900. In alternate embodiments, each media event may be associated with multiple entries in table 900. In some embodiments, parameters that may be associated with each entry in table 900 include start/end time (902), program ID (904), format (906), action (908), device (910), content source (912), and schedule source (914). However, other parameters associated with media content may also be included.

In table 900, each media event entry may be identified by a program ID parameter (904). The program ID may include any information that differentiates a media event entry with other media event entries. For example, the program ID parameter may include media event title or a system-assigned media event identifier, or any other unique identifier. Each media event may also be associated with a start and end time, which lists the date and times at which the media event is scheduled to be presented. In some embodiments, timeslot designations may be used instead of starting and ending times. Format parameter 906 may indicate the format of the media event associated with the entry. For example, a media event may be video (vid) or audio (aud) content. Video content may be in high-definition (HD) or H.264 format. Audio content may be in stereo or surround format.

In some embodiments, the video or audio designation and the particular video or audio format types may be considered different parameters. Action parameter 908 may indicate the action that is scheduled for a particular media event entry. For example, a media event may be scheduled to stream to a particular device, or to be recorded on a particular device. If the media event has been preloaded on a device, the scheduled action may be to present the preloaded media event. The device parameter (910) may indicate the content delivery device on which the action listed in 908 is to be performed for a particular media entry. Content source parameter 912 may indicate the current source of the media event associated with the entry. For example, media may be provided by the system operator or one or more third-party content providers ("provider1," "provider2," "provider3," etc.). Similarly, some media may be stored locally (local), or may be stored on a user device elsewhere (home). Schedule source parameter 914 may indicate how the media event associated with an entry was scheduled. A media event may be scheduled by the user (user) or automatically by the system, based on a system search (rec(sys)) or based on recommendations gathered elsewhere (rec(ext)).

Each user of the media planner application may be associated with a user profile. User profiles may be stored in storage 308 (FIG. 3) in some embodiments. User profiles may be generated manually, automatically, or via a combination of both. Manual generation of a user profile may include presenting a series of questions to a user relating to the user's media preferences. In some embodiments of manual generation of a user profile, the user may be able to access a setup, configuration, or preferences menu and be able to select or otherwise indicate viewing preferences and/or habits.

Automatic generation of user profiles may comprise monitoring the user's viewing preferences and habits. These preferences and habits may include types of media, sources of media, genres of media, lengths of media, and creators of or participants in media (e.g., writers, producers, or actors). Preferences and habits may further include times of the day (or week, or month) when a user tends to consume media, the particular kind of media the user tends to consume at particular times, the location of the user at certain times or when the user is consuming media, and the devices the user uses, has available at certain times or has available when the user is consuming media.

The media planner application may be configured to monitor these viewer preferences and habits and translate them into viewer parameters that may assist in media scheduling or media recommendation. In some embodiments, the media planner may be configured to connect to other electronic calendars or portable devices associated with the user and to monitor viewer habits and/or generate viewer preferences through these means. For example, if a user has a meeting scheduled with a home contractor, the media planner may use this information to decide that the user is interested in home renovation, and may schedule or recommend content related to this topic, such as a home improvement program or a workshop at a nearby home improvement store. As another example, if a user has a concert scheduled, the media planner may use this information to decide that the user is interested in the musicians or types of music at that concert, and schedule or recommend content or even other events accordingly. For example, the musicians' best hits may be automatically recommended for consumption during the user's scheduled travel time to the concert.

In some embodiments, user profiles may be generated by a combination of manual and automatic techniques. The user may answer a series of general questions about preferences and habits, and the media planner may use these answers to automatically generate a user profile. In some embodiments, the media planner may supplement these answers by monitoring user preferences, habits, and interactions.

In some embodiments, user profiles may contain restrictions as to the types of content a user is allowed to consume and/or the timeslots a user has available for content scheduling. These restrictions may be implemented as part of user preferences or as part of parental controls.

The media planner may utilize user profiles to schedule and/or recommend media. A user profile may comprise one or more sub-profiles. These sub-profiles are described in further detail below. The media planner may identify a viewer in a number of ways. In some embodiments, when a user accesses or turns on the media planner or associated media presentation system, the user may manually log into a profile. This manual login procedure may comprise entering a code such as a personal identification number or a password. In some embodiments, a biometric identification system may be utilized, such as a fingerprint scanner, an iris scanner, or a voice recognition system.

In some embodiments, viewer identification may be automatic. For example, if a particular user often carries around a particular portable electronic device that is configured to communicate wirelessly, such as a cellular phone, smart-phone, or Bluetooth-enabled device, the presence of the portable device (and by extension the user) may identify the presence of the user. In some embodiments, a subsequent manual identification setup may be implemented, to prevent another user from accessing a profile by simply obtaining the portable device.

The portable device may also act as a media presentation system. In some embodiments, a user may always be associated with a particular portable device, and may not need to log in to a user profile. In some embodiments, a user may have to manually log in via code entry or biometric identification.

A user profile may contain different types of information or one or more different sub-profiles. Each of these different information types or sub-profiles may be associated with one or more of a user's viewing preferences or habits. For example, a user profile may contain the type of media the user prefers, the media source or sources the user prefers, or the genre of media the user prefers. Optionally, a user profile may include information about the user's viewing habits, such as how long the user tends to view content, what devices the user prefers to use to view content, and the times at which the user tends to view content.

A user profile may contain a media type preferences sub-profile. This sub-profile may comprise media type (e.g., movies, music, episodic programs, webcasts, podcasts, games, etc.), media source (e.g., broadcast, on-demand, pay-per-view, online/internet, etc.), media length, genre (e.g., action, comedy, documentary, reality, sports, news, etc.), creator/participant (e.g., actor/actress, producer, writer, host, etc), and format (e.g., high-definition, audio, text, etc.).

Figure 8:
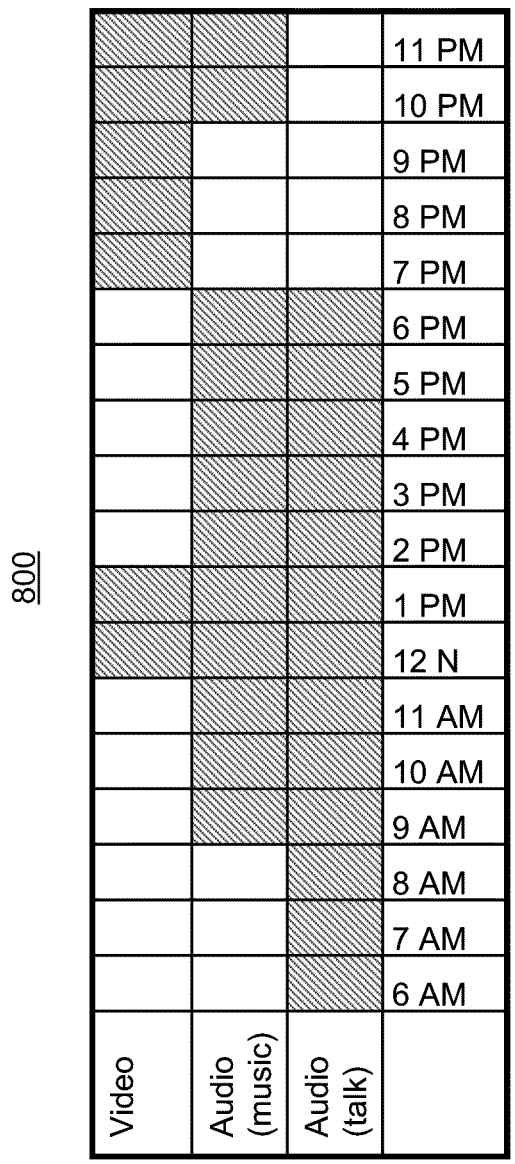
FIG. 8 depicts an illustrative example of a user mood profile based on content type, according to an illustrative embodiment of the invention.

The user profile may also include a mood sub-profile, which contains information about the kind of content the user is likely to enjoy at a particular time. This information may include particular content types (e.g., music or video) or particular content genres (e.g., action, drama, comedy, etc.) that the user favors at particular times. FIG. 8 depicts an illustrative example of a user mood profile based on content type. For example, the user may favor purely audio content in the form of speech in the early mornings (e.g., news, talk shows, etc.). In the mid to late mornings, the user may also begin to favor music in addition to speech. During a lunch break, the user may favor video and audio, but after lunch, the user may only favor music and speech. After the user arrives at home, the user may want to take a break from audio content and watch video content (with accompanying audio), until late evening, when the user might favor some music before bed.

Figure 10:
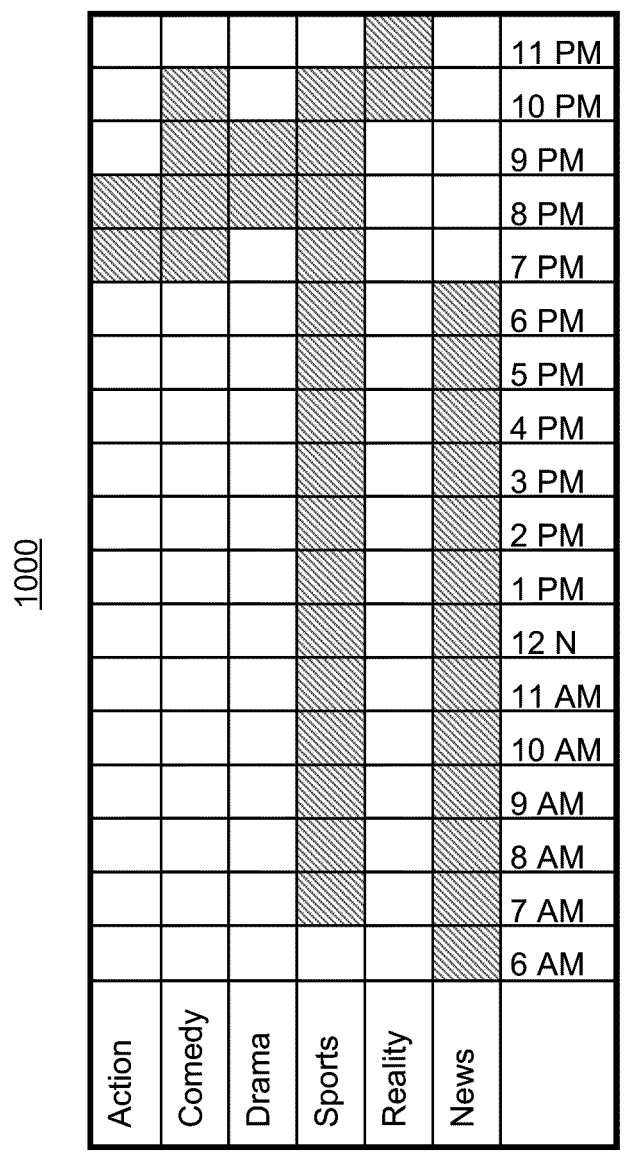
FIG. 10 depicts an illustrative example of a user mood profile based on content genre, according to an illustrative embodiment of the invention.

FIG. 10 depicts an illustrative example of a user mood profile based on content genre. For example, in the mornings, the user may prefer news or sports content in the morning and the afternoon. When the user arrives home, the user may initially favor action and comedy in lieu of news, and a little later the user may begin to also favor drama. Finally, the user may tire of action, drama and eventually sports and comedy while beginning to favor reality-related content. The media planner application may use any of the profiles and sub-profiles to automatically recommend or schedule media events on behalf of the user.

A user profile may also contain one or more accessibility preferences sub-profiles. This sub-profile may include information about the devices that may be available to a user at a particular time, the connectivity available to the user at a particular time, and the attention that the user is capable of at a given time.

The introduction of powerful portable electronic devices such as laptop/netbook computers, portable media players, and cellular or smart phones means that a user may be able to access stored or streaming media content at locations outside the home. Similarly, the advent of multiple content delivery devices within households means that a user has the option of consuming content from multiple locations within the home. Information about the particular content delivery devices a user has available at a particular time may be useful for constructing a unified content schedule. FIG. 11 depicts an illustrative example of a device accessibility sub-profile. As shown in FIG. 11, a user may have access to all available devices in the mornings and evenings, when the user is at home. During the user's commute to and from work, the user may only have access to a portable phone, a portable media player, and a car audio system. At work, the user may only have access to a phone, portable media player, and/or a laptop. If the user goes to the gym, the user may only have access to a phone and a portable media player.

In some embodiments, the availability of content delivery devices may be based on proximity. For example, some households may have a primary television in the living room, a secondary display in the bedroom, an audio system in the kitchen, and a computer in a home office. A user may spend the early evening in the kitchen listening to the audio system, the mid-evening in the living room or home office watching the primary television or using the computer, and the late evening in the bedroom watching the secondary display.

Figure 12:
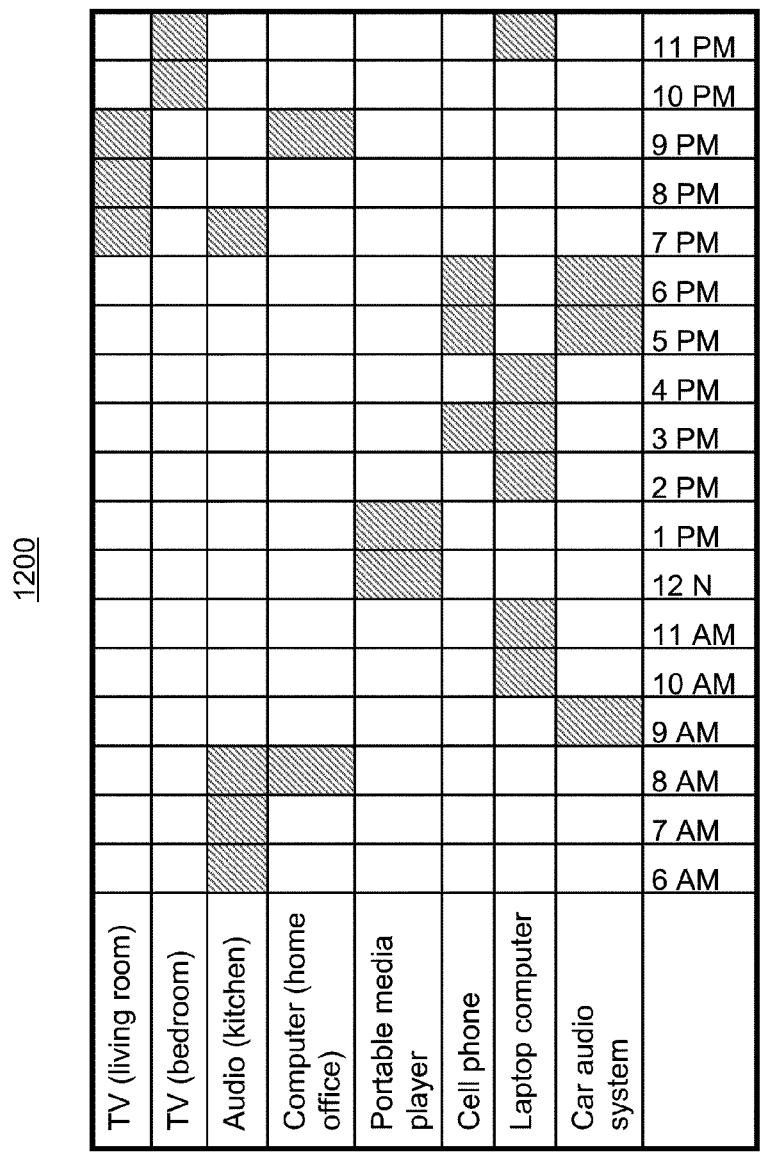
FIG. 12 depicts an illustrative example of a device availability sub-profile based on actual usage, according to an illustrative embodiment of the invention.

Similarly, the availability of content delivery devices may also be based on actual usage. Although a user may actually have access to multiple content delivery devices at a given time, the user may typically only use one or two simultaneously. FIG. 12 depicts an illustrative example of device availability based on actual usage. In the mornings, the user may be primarily in the kitchen listening to audio, with a few quick trips to the home office to use the computer. During the commute to work, the user may spend the time listening to the car audio system. At work, the user may primarily spend time on the laptop, with occasional uses of a cell phone in the afternoon. During lunchtime, the user may bring a portable media player to the gym. During the commute home, the user may both listen to the car audio system and be using the cell phone. Once the user has returned home, the user may prepare dinner in the kitchen, listening to the audio system there, but spend most of the time in the living room, watching the primary television. After dinner in the living room, the user may remain in the living room, with occasional jaunts to the computer in the home office. Finally, the user may retire to the bedroom to watch the television there and to use the laptop from bed. The media planner application may monitor all usage of media devices within the media system (e.g. system 400 of FIG. 4) and automatically generate a device accessibility sub-profile, in some embodiments.

Because different media devices may be compatible with different types of media content formats, another user sub-profile may include a device format compatibility table. FIG. 13 shows an illustrative device format compatibility table 1300 that may be stored in storage 308 (FIG. 3). As table 1300 shows, different content delivery devices may support different content formats. For example, televisions may be able to support one or both of standard and high definition video formats and one or both of stereo or surround audio, but may not be able to support H.264 video formats. Similarly, a portable media player may only be able to support H.264 video and stereo audio formats.

Figure 14:
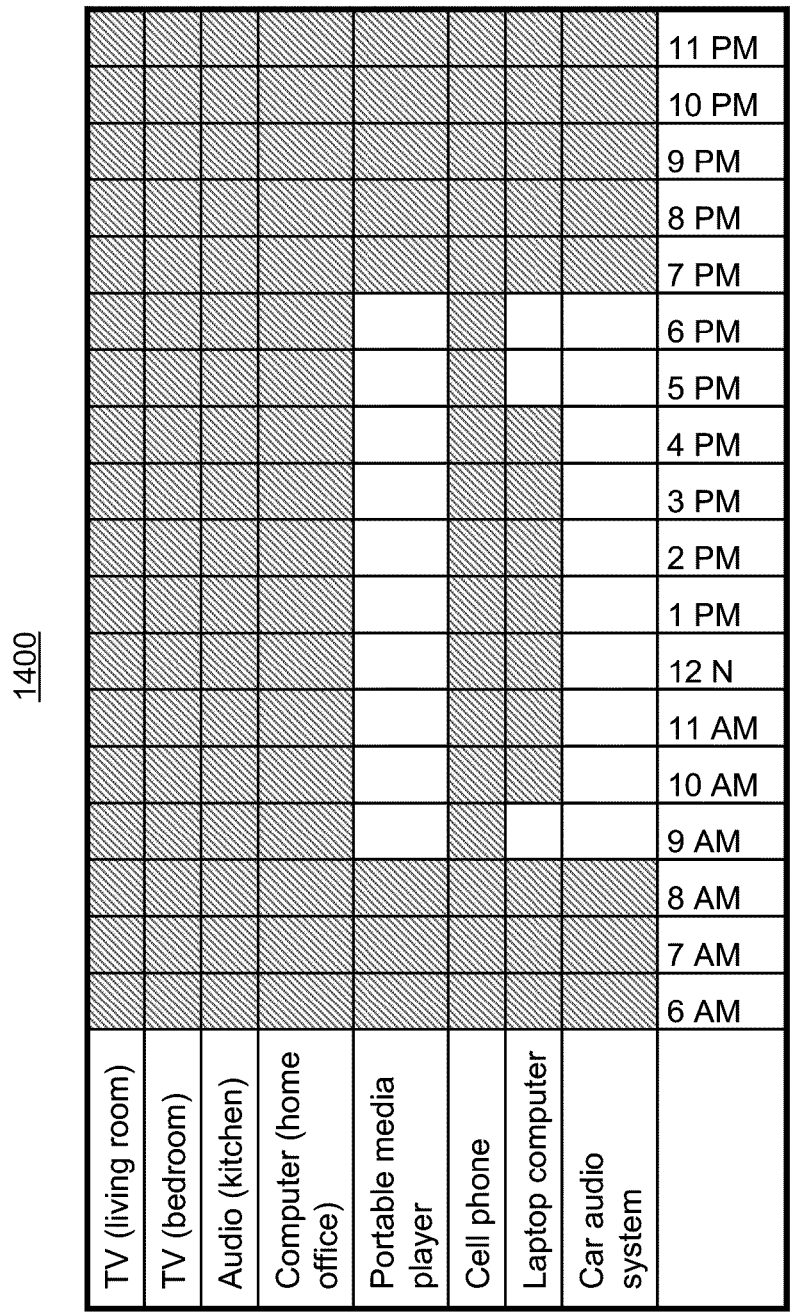
FIG. 14 depicts an illustrative example of a connectivity sub-profile, according to an illustrative embodiment of the invention.

Another user profile sub-profile may be a connectivity profile, which contains information about the connection capabilities of content delivery devices as a function of time. FIG. 14 depicts an illustrative example of a connectivity sub-profile. In some embodiments, devices in the home network are always considered to be connected. When the user is not at home, any portable media devices the user is carrying may or may not be connected, depending on device networking and connection capabilities. Because the media planner application may schedule content for times when the user is not at home, such as during the user's commute and/or time at the gym, for delivery via a portable phone, media player, or other device, the media planner application may ensure that the scheduled content is available to the portable device at the appropriate time. In some embodiments, the scheduled content may be preloaded onto the portable device at a prearranged time before the scheduled time. For example, content may be preloaded onto one or more portable devices when the user is within the home network. In this embodiment, content that is scheduled to be delivered to the user during the user's outbound and inbound commute, as well as the user's time at the gym, may be preloaded onto the portable device or devices the previous evening or in the morning, when the user is at home. Optionally, the media planner application may be able to remind the user to physically connect portable devices to the network, the media planner, or another device on the network so that the media planner can ensure that the scheduled content can be preloaded onto the portable devices.

In some embodiments, the media planner application may be able to access the portable devices outside the home, via, for example, a cellular or mobile data network or a wireless or wired network. In these embodiments, the media planner application may deliver the scheduled content to the portable device when a connection is available, in real time or shortly before the content is scheduled. In some embodiments, the media planner application may monitor the connectivity of one or more content delivery devices actively or passively. For example, the media planner application may actively attempt to query each content delivery device to determine if it is connected. These queries may be performed periodically, according to a time interval set by the user or set automatically. In some embodiments, these queries may be performed during the course of a device or schedule update. In some embodiments, the media planner application may passively monitor content delivery device traffic in order to determine connectivity. For example, if a particular content delivery device queries the media planner application for a schedule update, or if the user accesses the media planner application from a particular content delivery device, then the media planner application may determine that that particular content delivery device is connected.

Figure 15:
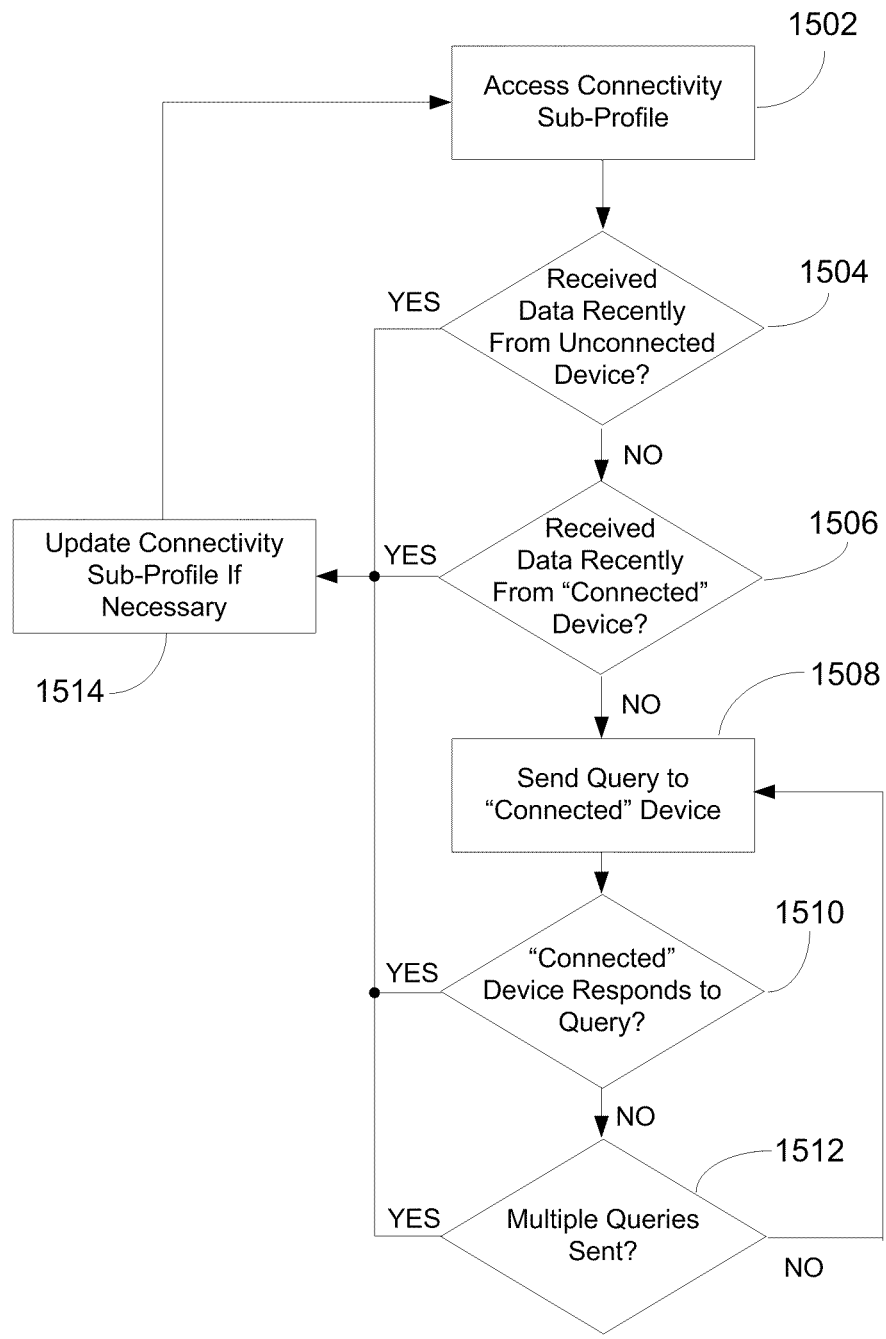
FIG. 15 is a flowchart depicting an illustrative process for constructing and maintaining a connectivity sub-profile, according to an illustrative embodiment of the invention.

FIG. 15 is a flowchart depicting an illustrative process for constructing and maintaining a connectivity sub-profile. First, a connectivity sub-profile may be accessed (step 1502) For example, the connectivity sub-profile may be stored individually or as part of a user profile on storage 308 (FIG. 3), and may be accessed by processing circuitry 306 (FIG. 3). The connectivity sub-profile may be accessed as a result of a user-scheduled or system-scheduled media event, or may be accessed periodically according to user-set or system-generated preferences. Upon accessing the connectivity sub-profile, it may be determined if data has been received within a recent time span from devices that are indicated as unconnected in the connectivity sub-profile (step 1504). The recent time span may be user-set or system-generated. If so, the connectivity sub-profile may be updated in step 1514 to change the status of the unconnected device(s). In some embodiments, data may have to be received a number of times over a particular time span in order to change the status of the device(s). If data was not received from one or more devices indicated as unconnected, it is determined if data was recently received from one or more devices indicated as "connected" in the connectivity sub-profile (step 1506). If so, the connectivity sub-profile is updated if necessary (step 1514). If at least one device indicated as "connected" has not recently sent data, one or more queries may be sent to the at least one "connected" device (step 1508). For example, queries may take the form of pings or acknowledgement requests. If the at least one "connected" device responds to the one or more queries (step 1510), then the connectivity sub-profile may be updated if necessary (step 1514). If not, it may be determined if multiple queries have been sent (step 1512). If not, further queries may be sent to the at least one "connected" device (step 1508). If multiple queries have been sent, then the connectivity sub-profile may be updated (step 1514) to indicate that the at least one "connected" device(s) is no longer connected. In some embodiments, the multiple queries may be made over a user-specified or system-specified span of time, and the number of queries may be user-specified or system-specified. After the connectivity sub-profile has been updated, the process may return to step 1502.

In some embodiments, the media planner application may not directly deliver content to a portable device. Instead, the media planner may deliver a pointer to the content to the portable device. The portable device may then automatically access the content in order to load it into local storage on the portable device, or it may directly access the content in real time, similar to a media stream. This latter implementation may be particularly useful for broadcast or live events that the user wishes to view or listen to in real time.

Other user profile sub-profiles may be related directly to the user. One example of such a sub-profile may be an attention sub-profile, which contains information about what the user may be doing at a particular time or what devices the user is likely to be using at a particular time. This information may be useful for the media planner application to be able to schedule appropriate types of content at particular times. For example, the media planner application may schedule content for a user during the user's commute. The content that is scheduled may differ depending on the details of the commute. For example, if the user commutes via public transportation, the media planner may schedule audio, video, or other content for the commute. However, if the user commutes by driving, video or other interactive content may not be appropriate, and the media planner may only schedule audio-type content.

The user attention sub-profile may also include information about how long the user tends to pay attention to a particular piece of content or type of content. For example, a user may prefer relatively short (e.g., less than 30 minutes) content versus longer content. The user content length preference may also vary according to content type. For example, a user may prefer to watch video programs and listen to audio speech (e.g., talk shows, news, etc.) between 30 minutes and an hour, but may prefer listening to music for fifteen minutes or less. Similarly, a user may prefer to listen to pop or rock music for ten minutes or less, but prefer to listen to classical music for more than thirty minutes.

Media content recommendations may be made to the user by the media planner application in a number of ways. In some embodiments, the media planner application may generate its own recommendations, based at least in part on user profiles and sub-profiles. The media planner application may generate recommendations automatically or upon user request. Optionally, the media planner application may obtain media recommendations from other sources. For example, system operators or third-party content providers may recommend media, and the media planner application may query system operators or content providers for media recommendations. Media recommendations may also be available from online media and/or recommendation sources. These online sources include web logs (also known as blogs), user or fan forums, news websites, review websites, social networking websites, and other websites or sources of online content. The media planner application may search these online sources for media recommendations. Optionally, the media planner application may subscribe to one or more of these online sources in order to receive recommendations or content, either automatically, or at the user's request.

In some embodiments, the media planner application may generate a list of recommended content, which may include local recommendations generated by the media planner and recommendations obtained from other sources. Each item on the list of recommended content may be categorized and/or ranked based on content parameters (e.g., source, type, length, genre, etc) and/or on how closely it matches one or more user preferences. The media planner may make content recommendations based on the categorized and/or ranked recommended content list. Optionally, the media planner application may dynamically re-rank the items in the recommended content list based on current conditions (e.g., current time) or user input. In some embodiments, the media planner application may dynamically re-rank all the items in the recommended content list and provide one or more of the highest-ranked content items to the user as recommendations. In some embodiment, the media planner application may filter the recommended content list to generate a subset of content items, rank the items in the subset, then provide one or more of the highest ranked items in the subset to the user as recommendations.

Figure 16:
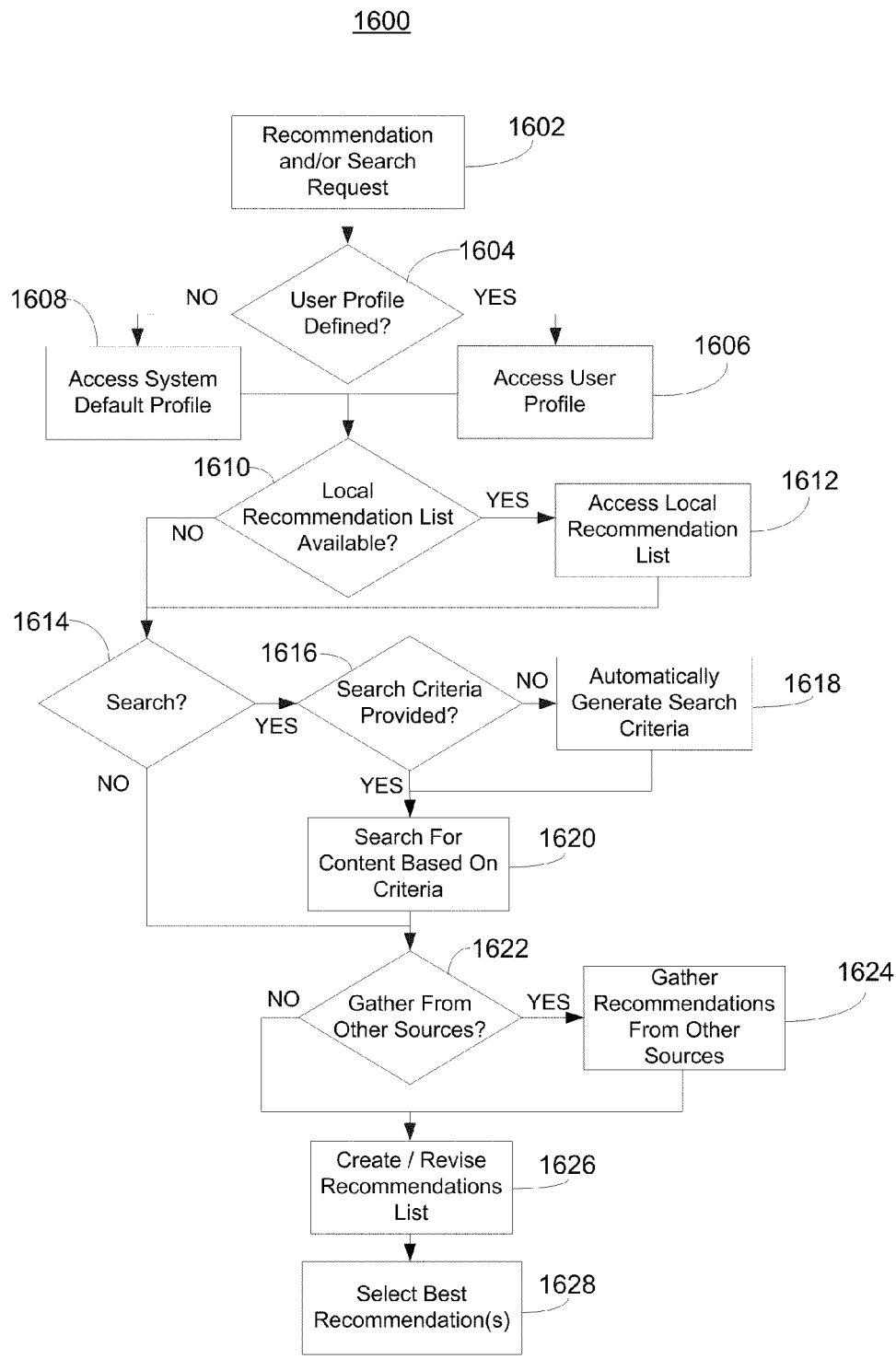
FIG. 16 is a flowchart depicting an illustrative recommendation process, according to an illustrative embodiment of the invention.

FIG. 16 is a flowchart depicting illustrative recommendation process 1600. In some embodiments, this recommendation process may be carried out by the media planner application. When a recommendation or content search is requested, either by the user or by the system (step 1602), it is first determined if there is a user profile defined (step 1604). If so, the user profile is accessed (step 1606) to determine pertinent user parameters such as device accessibility, connectivity, device usage, and/or user mood as described above. These parameters may be stored in one or more sub-profiles. If a user profile has not been defined, then a system default profile is accessed (step 1608). They system default profile may contain parameters similar to those in a user profile, but may be set by, for example, the system operator. In some embodiments, one or more users may be able to modify the system default profile. Next, it is determined if a local recommendation list is available (step 1610). If so, the recommendation list may be accessed (step 1612) and one or more suitable content recommendations may be determined from the recommendation list, based at least in part on the user parameters determined above. In some embodiments, whether or not a local recommendation list is available, the next step is content search decision step 1614. In step 1614, it may be decided if a search for available content is necessary or desired. For example, if a user has explicitly requested a content search, a search will be performed. If one or more suitable content recommendations were found in step 1612, then a content search may not be necessary. However, if no suitable content recommendations were found in step 1612, or if no local recommendation list is available, a content search may be necessary.

If the decision at step 14 is that a content search should be performed, it is first determined if search criteria has been provided (step 1616). For example, if a user requested the search, the user may also have provided one or more search criteria. Search criteria may include parameters such as content type, genre, length, or any other parameter associated with content. If it is determined that search criteria has been provided at step 1616, a content search based at least in part on the provided search criteria will be performed in step 1620 to determine one or more suitable content recommendations. On the other hand, if it is determined that search criteria has not been provided at step 1616, search criteria may then be automatically generated at step 1618. Automatic generation of search criteria may be based at least in part on the user parameters contained in the user or system default profiles mentioned above. Once search criteria has been generated, a content search based on the generated criteria will be performed in step 1620 to determine one or more suitable content recommendations.

Following step 1620, or if the decision at step 1614 is that a content search is not to be performed, it is determined if content recommendations should be gathered from other sources (step 1622). Other sources from which recommendations can be gathered include the system operator, third-party content providers, or other online sources and/or communities. If the decision at step 1622 is affirmative, then content recommendations may be gathered at step 1624. After recommendations have been gathered, or if the decision at step 1622 was to not gather recommendations, the local recommendation list may be updated based on the results of the content search and the gathered recommendations at step 1626. Alternatively, if a local recommendation list was not available in step 1610, then a new local recommendation list may be created based on the results of the content search and the gathered recommendations.

In some embodiments, if one or more suitable content recommendations are found, one or more best recommendation(s) may be selected for presentation (step 1628). If the user had requested the recommendation(s), then the selected one or more best recommendations may be provided to the user. Alternatively, if the recommendation/content search was initiated automatically, then the selected best recommendation(s) may be automatically inserted into a user schedule, or just incorporated into the local recommendation list. The selection may be performed by comparing recommended content parameters to user profile and preference information, assigning weight scores to each piece of content, and selecting one or more of the highest-scoring pieces of content. In some embodiments, the local recommendation list search at step 1612, the content search at step 1620, or the recommendation gathering at step 1624 may be separately enabled or disabled. For example, in some embodiments, recommendations from other sources may never be gathered, and only local recommendation and content searches are performed. In some embodiments, the content search and recommendation gathering steps (H20 and H24) may be performed at predetermined or dynamic time intervals, independent of whether a request for recommendations has been made. For example, content searches may be set to be conducted every hour or day. Likewise, recommendations from other sources may be gathered every fifteen minutes or six hours. These time intervals may be user-set, system-set, or dynamically adjusted based on user interaction with the system.

In some embodiments, recommendations may be generated based on more than one user profile. For example, two friends, each with a user profile, may enjoy consuming media content together at particular times. Content may be recommended and/or scheduled for those times based on both user profiles. In some embodiments, there may be a joint user profile representing the preferences of the friends specifically, and recommendations may be generated based at least in part on the joint user profile in addition to or instead of the two separate user profiles. User profiles may be stored in storage 308 (FIG. 3) or on a network storage device and accessed by authorized users. For example, a user may designate the user's friends as authorized users to access the user's profile.

In some embodiments, if a schedule timeslot where a user usually consumes content is available, recommended media content may automatically be scheduled for that timeslot. Optionally, a feedback prompt may be provided for the user when content is automatically scheduled. A feedback prompt may be presented to the user when content is automatically scheduled, when the user selects an automatically scheduled piece of content, or otherwise indicates that the user wishes to obtain more information about or modify the automatically scheduled content. The feedback prompt may include an option for the user to cancel the automatically scheduled content, an option to cancel all automatically scheduled content, an option to accept the automatically scheduled content, an option to accept all automatically scheduled content, an option to reschedule the automatically scheduled content, an option to search for other, similar content, an option to search for other recommended content, or a combination of the foregoing options. In some embodiments, the options to search for other content may include options for selecting desired content type, source, length, genre, or any other parameter associated with content.

In some embodiments, the automatically scheduled content may be automatically considered to be accepted unless the user indicates otherwise. In some embodiments, multiple-content events may be automatically recommended and scheduled in a timeslot. In these embodiments, a default content event may be designated, which will automatically be presented in place of the other content events if the user does not indicate otherwise. The determination of the default content event may be performed by evaluating how highly the various content event options are recommended or rated, or how closely they match user preferences. For example, a basketball game and a hockey game may be recommended and scheduled for the same timeslot. If the user has indicated in the past that the user prefers watching hockey over basketball, then the hockey game may be designated as the default content.

In some embodiments, advertisements may be provided according to the recommendation procedures discussed above. The user may be able to select recommended advertisements the user wishes to view, or recommended advertisements may be automatically presented. In some embodiments, recommended advertisements may be automatically embedded in scheduled media events.

Figure 17:
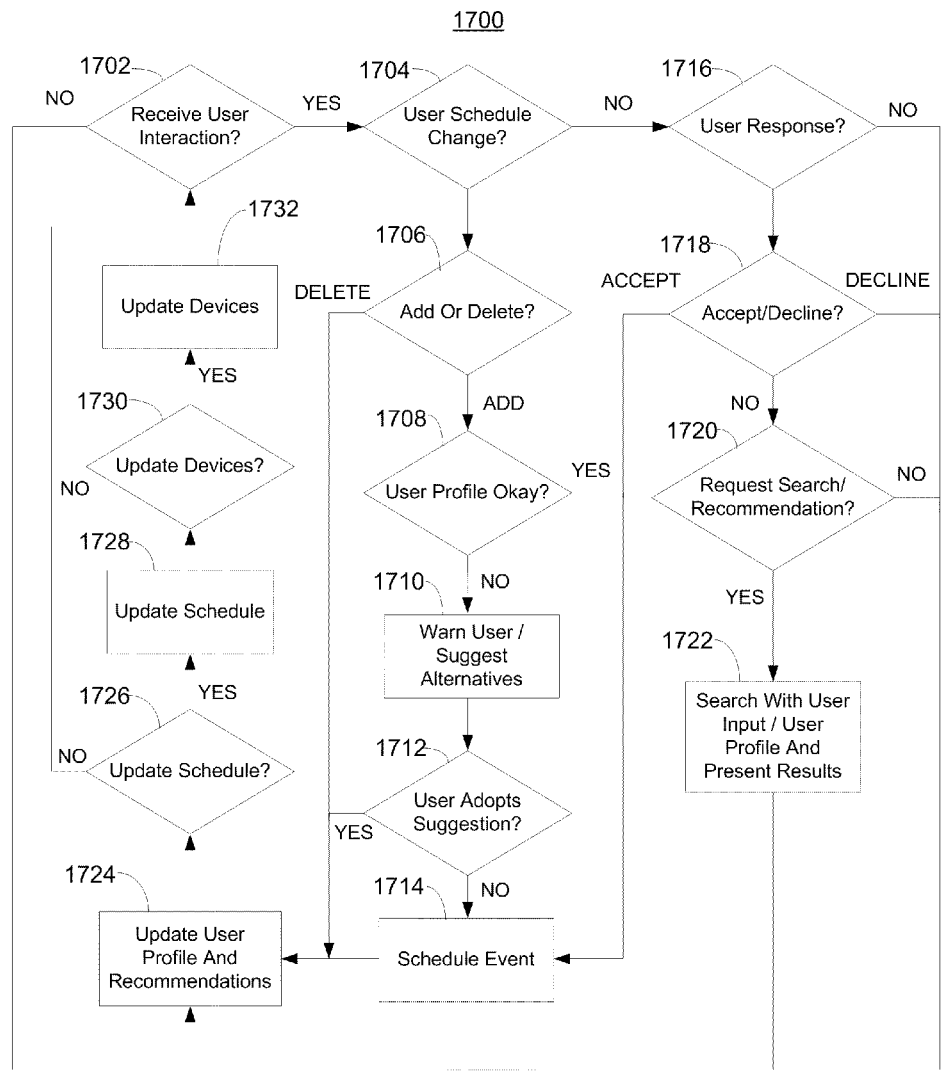
FIG. 17 is a flowchart depicting an illustrative example of a media planner scheduling process, according to an illustrative embodiment of the invention.

FIG. 17 shows illustrative process 1700 for scheduling media events. Using the user profile information and recommendation information described above, media content schedules for one or more users may be constructed and populated. The media content schedules may be constructed and populated by a media planner application executed on processing circuitry 306 (FIG. 3). Schedules may be stored in storage 308 (FIG. 3) or on a network storage device. There may be some flexibility as to how content is scheduled. In some embodiments, a user-set schedule may not be altered. For example, if the user specifically schedules a particular program or piece of content for a particular timeslot, the media planner may not, in some embodiments, be able to schedule different content for that timeslot. However, in other embodiments, the media planner may be able to suggest or recommend different content for that timeslot or alternatively automatically overwrite user-created media events with system-recommended events.

Outside of user-scheduled media events, content may be scheduled to available timeslots in a highly flexible manner. In some embodiments, the available timeslots are examined, and the best content to schedule in those timeslots is determined. This determination may be based on a number of factors, such as the source, nature, and length of the content, the user profile and sub-profiles, and/or media recommendations. In some embodiments, scheduling determinations may be made based on multiple user profiles.

Each scheduled media event or recommendation may be associated with a particular content delivery device, such as devices 402, 404, and 406 (FIG. 4). For example, when the user schedules a particular media event, the user may select the device from which the event is to be presented or to which the media event is to be delivered. In some embodiments, the user may select that a particular media event is to be presented simultaneously from multiple devices. If the user does not select a presentation device for a particular media event, or when the media event is automatically scheduled, an appropriate presentation device for the media event may be automatically selected, based on user profile elements such as device availability and connectivity. In some embodiments, the user may be able to schedule a media event to be presented on a particular device from a different device. For example, the user may use a cell phone or laptop to schedule media events to be presented on the living room television and/or kitchen audio system. In some embodiments, devices that are not available or not connected (as determined from the device availability and connectivity sub-profiles) may be automatically removed from consideration as potential delivery devices during that timeslot.

In some embodiments, the user may directly schedule media events for particular timeslots. Optionally, the user may also schedule media events for particular devices. When user interaction is first received via, for example, user input interface 310 in FIG. 3 (step 1702), the nature of the interaction is first determined by, for example, processing circuitry 306 (FIG. 3). If the user is attempting to change the schedule by adding or deleting programs (step 1704), first it is determined if the user wishes to add or delete programs (step 1706). If the user is deleting programs, then the user profile and recommendations stored in, for example, storage 308 (FIG. 3), are updated based on the deleted programs in step 1724. If the user is adding programs, the user profile is accessed (step 1708) to determine the likely status of the user at that timeslot. Specifically, the stored user profile may be accessed in order to determine the devices that may be available, the connectivity of the devices, what devices the user is likely to be paying attention to, and what types or kinds of content the user is likely to favor. Based on this information, the suitability of the user-scheduled content may be first evaluated, and warnings and alternatives may be provided if necessary (step 1710). For example, if the user attempts to schedule video content during the user's morning drive to work, the user may be warned by processing circuitry 306 via display 312 (FIG. 3) that the content may not be able to be viewed as scheduled, and audio content may be recommended in place of the video program. Similarly, if the user attempts to schedule a high-definition version of video content for viewing when the user is at the gym, the user may be warned that the high-definition version may not be viewable, but may be provided an offer to transcode or otherwise obtain a lower-definition version of the content suitable for the devices that the user is likely to have available, e.g., a portable media player. As another example, if a user attempts to schedule media content for presentation on a portable device, the user may be warned if the portable device currently does not contain the media content and will not be able to receive the content in time for the scheduled presentation. In some embodiments, suitable content recommendations may be determined and presented during warning/suggestion step 1710. One or more recommended content items may be generated by processing circuitry 306 (FIG. 3) from the local recommendation content list, based on user profile information.

If the user accepts one or more of the content suggestions and/or recommendations, then the user profile and recommendations are updated at step 1724, based at least in part on the accepted recommendations. If the user declines the suggestions and/or recommendations, the user-requested event will be scheduled (step 1714), and in step 1724, the user profile and recommendations may be updated based on the user-requested event and the declined suggestions and/or recommendations. This update process may be performed by processing circuitry 306 in FIG. 3, or by a media planner application executing on processing circuitry 306 in FIG. 3.

In general, a user may be allowed to schedule any media event at any timeslot the user requests. However, in some embodiments, a user may be prevented from scheduling a particular media event or scheduling content at a particular timeslot, or the scheduled media event may be modified or changed. For example, a parental control sub-profile present in a user's profile may provide viewing restrictions for that user. These viewing restrictions may prevent the user from consuming particular types of content based on parameters such as genre, rating, title, or any other parameter associated with media content.

Similarly, these viewing restrictions may prevent the user from consuming content at particular timeslots, such as in the mornings or in the evenings. When a user with a parental control sub-profile attempts to schedule content, it may be determined if the particular content and/or the timeslot is allowed by the parental control sub-profile. If so, then the content may be allowed to be scheduled at that timeslot. If not, the user will not be allowed to schedule the content at that timeslot. If the timeslot is not allowed but the content is allowed, the user may be provided with the option of rescheduling the content at a different timeslot. If the timeslot is allowed but the content is not allowed, the user may be provided with an option to schedule alternative content at that timeslot. In this embodiment, possible alternative content may be suggested or recommended to the user. If neither the timeslot nor the content is allowed, an alternative timeslot and/or alternative content may be suggested if any are available. Alternative content may include other forms of content that are determined to be similar to a particular piece of content by the media planner application. Alternative content may also include alternate versions or formats of a particular piece of content.

When user interaction is received via, for example, user input interface 310 in FIG. 3 (step 1702), the user interaction may be determined to be a response to a content suggestion, recommendation, or automatically scheduled content. This user response may include a request for more information about recommended content, accepting recommendations, declining recommendations, a request to search for other, similar content, or a request to search for other recommended content. Upon determination of receipt of a user response by, for example, processing circuitry 306 or a media planner application executing on processing circuitry 306 in FIG. 3 (step 1716), first it is decided if the user wishes to accept or decline one or more recommendations (step 1718). If so, it is determined if the user has accepted or declined the recommendations. If the user accepts the recommendations, the recommended events are scheduled in step 1714, and the user profile and recommendations are updated based at least in part on the accepted events in step 1724. If the user declines the recommendations, the user profile and recommendations are updated in step 1724 based at least in part on the declined events. For example, if the user accepted the recommendation, then the recommended content may replace the content that was previously scheduled for that timeslot. Similarly, if the user declined the recommendation, the recommendation may be removed.

If the user response is not directed toward accepting or declining recommendations, it may be determined if the user instead wishes to search for content or receive recommendations (step 1720). If so, a content search may be performed (step 1722). Content searches may be performed by processing circuitry 306 (FIG. 3) or by a media planner application executing on processing circuitry 306 (FIG. 3). Content searches may be similar to the content searches described above in relation to providing content recommendations. In some embodiments, the user may provide search criteria when indicating that the user wishes to search for content or recommendations. In these embodiments, the content search may be based only on the provided search criteria or based both on the provided search criteria and user profile information. If the user merely wishes to receive recommendations without providing user criteria, one or more recommendations may be provided from the local recommendation list. In some embodiments, a content search may also be performed to determine additional recommendations. The search/recommendations results may then be displayed via, for example, display 312 (FIG. 3), to the user. The user profile and recommendations may then be updated based at least in part on the user-requested search and/or recommendations in step 1724.

If the user response was not directed toward accepting or declining recommendations or searching for content or recommendations, the user profile and recommendations may then be updated in step 1724, based at least in part on the user response. Similarly, if the received user interaction is not directed toward a user-requested schedule change or a user response to a media planner suggestion, recommendation, or automatically scheduled content, the user profile and recommendations may then be updated in step 1724, based at least in part on the user response. For example, one or more tables in a relational database stored in storage 308 (FIG. 3) may be updated.

The user may also interact with system 400 and the media planner application in other direct and indirect ways. Direct user interaction with the media planner application may comprise modifying user preferences or querying the media planner for alternative and/or recommended content. Indirect user interaction with the media planner may comprise consuming scheduled and/or recommended content, and may also comprise the failure of a user to consume scheduled and/or recommended content. Indirect user interaction may also include monitoring of the usage of content delivery devices and device connectivity. User habits may also be monitored via electronic calendars or portable devices equipped with location-sensing abilities.

In some embodiments, the content schedule and recommendations may be automatically updated. The automatic update process may be scheduled manually or automatically. For example, the update process may occur every hour. When the content schedule and recommendations are to be updated, they may be updated in step 1724. For example, one or more tables of a relational database stored on storage 308 (FIG. 3) may be updated at step 1724.

Regardless of whether user interactions have been received, or the type of user interactions received, at some point the user profiles, recommendations, and schedules may be updated or modified. In step 1724, user profiles and recommendations may be updated. If user interactions were received, then the user profile may first be updated. Any of the information and/or sub-profiles contained within the user profile may be updated. For example, if the user accepted a recommended comedy video event scheduled in the morning, the media planner application may update the user mood profile to indicate that the user may now be interested in video content and comedy content in the morning. Similarly, if the user watches a scheduled media event on a different device than the originally-scheduled device, the media planner may update the user profile to indicate that the user prefers the different device for that particular type of media event and/or at that particular time slot. In some embodiments, the user profile modification may be based on historical data of user interactions and habits. For example, user history information may be used to automatically generate sub-profile information regarding, for example, the user's favorite viewing times, favorite genre preferences during those viewing times, and any other suitable information.

In step 1724, the list of recommended content may also be updated via the recommendation process described above by, for example, processing circuitry 306 or a media planner application executing on processing circuitry 306. If the user profile has been updated, the recommendations list may be automatically updated to incorporate any new user profile information. Optionally, the recommendations list may also be updated even if the user profile has not been updated to incorporate any new information provided by, for example, other content sources such as system operators, third-party content providers, and other online sources. Updated recommendations may then be provided directly to the user or on the schedule.

After the user profiles and recommendations have been updated, if necessary, a determination may be made if the media event schedule should be updated in step 1726. The media event schedule may be updated if the user profile has changed and/or there is new recommended content. For example, if a user has indicated that the user now does not prefer action content over drama content, new content recommendations may have been made, and old recommendations of action content may need to be replaced. Similarly, if new, empty timeslots have opened up, recommended content may be automatically scheduled for those empty timeslots. To update an event schedule, one or more tables in a relational database stored on storage 308 (FIG. 3) may be updated. If the media event schedule does not need to be updated, the scheduling process may return to step 1702. If the media event schedule does need to be updated, the appropriate content additions and/or substitutions are made. These recommendations and updates may be made by processing circuitry 306 (FIG. 3) or a media planner application executing on processing circuitry 306 (FIG. 3).

If the media event schedule is updated, then a determination is made if the content delivery devices need to be updated. For example, if a user has scheduled a new media event on the user's laptop or portable media player, the media planner may need to ensure that the device can access the media event at the appropriate time. If, however, according to the connectivity sub-profile, the device will not be connected at the appropriate time, a media content transfer may be scheduled to the device at the earliest opportunity. As another example, a user may schedule a broadcast media event to be presented at a timeslot after the broadcast timeslot. In this instance, the media planner application may ensure that the media event is recorded (e.g., locally on storage 308 in FIG. 3 or to a network recording device or media server) or otherwise available for presentation at the desired time. If the content delivery devices do need to be updated, then the devices are updated at step 1732 if possible. If the devices do not need to be updated, then the scheduling process may return to step 1702.

In some embodiments, updating content delivery devices may involve determining if media content that is to be delivered to a device is in an appropriate format. In these embodiments, media events scheduled to be delivered from a particular device should be in a format that the device can support. For example, if a user has scheduled a high-definition video for viewing on a portable media player that is unable to support high-definition, the media planner application may need to ensure that a version of the video in a suitable format is available to the portable media player at the scheduled viewing time.

Figure 18:
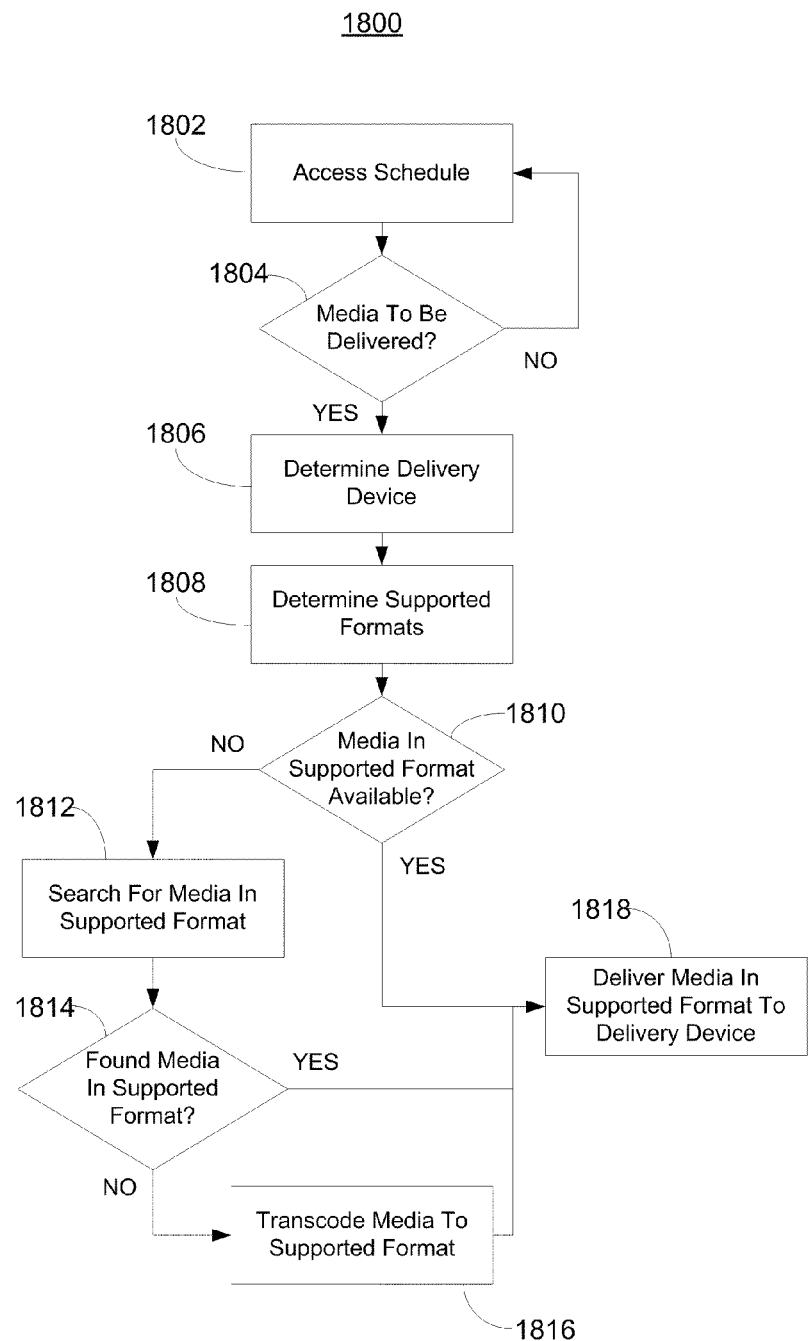
FIG. 18 is a flowchart depicting an illustrative process for providing media content in a suitable format to a content delivery device, according to an illustrative embodiment of the invention.

FIG. 18 shows illustrative process 1800 for providing media content in a suitable format to a content delivery device. In step 1802, a content delivery schedule, which may be stored on storage 308 (FIG. 3), may be accessed. In step 1804, it is determined if media content is to be delivered to a content delivery device. This may occur in the context of content streaming and/or preloading. For example, if a live broadcast show is scheduled to viewed at the current timeslot, the show may be streamed to one or more delivery devices. However, if a recorded media event is scheduled to be presented on a portable device at some point in the future, the media event may need to be transferred to or preloaded on the portable device some time before presentation, possibly due to lack of connectivity at the scheduled presentation timeslot. In this instance, it may be desirable to deliver media content to the device before the scheduled presentation timeslot. If it is determined in step L04 that media does not need to be delivered, then the process may revert to step 1802. In some embodiments, step 1802 may be performed periodically (e.g., every ten minutes, half hour, hour, etc.) or may be performed as a result of an automatic request. If it is determined in step 1804 that media does need to be delivered, the process continues to step 1806.

When media does need to be delivered, in step 1806, the device to which the media is to be delivered is determined. Then, in step 1808, it is determined what media formats the device supports. For example, a media planner application may consult device format compatibility table 1300 (FIG. 13), which may be stored in storage 308 (FIG. 3). After the device-supported formats have been determined, it may be determined if the media content to be delivered is available in one or more device-supported formats (step 1808). The availability determination may be based on whether media content in the one or more supported formats is stored locally, such as in storage 308 (FIG. 3), and/or whether it is stored in a network storage device, or otherwise easily accessible. If the media content is available in a device-supported format, then, the media content may be delivered to the content delivery device (step 1818), either for immediate presentation or storage on the delivery device for future presentation.

If, on the other hand, the media content is not available in a device-supported format, in step 1812, a search for the media content in a device-supported format may be performed. In some embodiments, this search process may be similar to the recommendation/search process 1600 (FIG. 16), where the search criteria includes one or more device-supported formats. Alternatively, another search process may be used. If the search in step 1812 finds the media content in a device-supported format, then the media content may be delivered to the content delivery device in step 1818. If not, the media content may be transcoded to a device supported format in step 1816. The transcoding process may occur locally (i.e., within device 300 (FIG. 3)) or remotely (i.e., within system 400 (FIG. 4)). For example, processing circuitry 306 (FIG. 3) may transcode the media content into a device-supported format. Optionally, the transcoding process may occur at another user device (e.g., a network media server). For example, any of devices 402, 404, or 406 in FIG. 4 may be able to transcode media content into a device-supported format. After the transcoding step of 1816, the resulting media content, now in a device-supported format, may be delivered to the content delivery device.

Variations, modifications, and other implementations of what is described may be employed without departing from the spirit and scope of the invention. More specifically, any of the method, system, and device features described above or incorporated by reference may be combined with any other suitable method, system, or device features disclosed herein or incorporated by reference, and is within the scope of the contemplated inventions. The systems and methods may be embodied in other specific forms without departing from the spirit or essential characteristics thereof. The foregoing embodiments are therefore to be considered in all respect illustrative, rather than limiting of the invention. The teachings of all references cited herein are hereby incorporated by reference in their entirety.

The above described embodiments of the invention are presented for purposes of illustration and not of limitation, and the present invention is limited only by the claims which follow.

What is claimed is:

1. A method for scheduling media content presentation across multiple user devices, comprising:
   accessing stored user profile information in a memory, wherein the stored user profile information identifies a first user device and a second user device different than the first user device, wherein the stored user profile information comprises first user information on content types that a user favors at different timeslots and second user information on lengths that the user favors for each of the content types;
   automatically scheduling a first media content event to be presented in the future on the first user device during a first timeslot based at least in part on a content type of the first media content event, a length of the first media content event, and the first and second user information comprised in the user profile information;
   automatically scheduling a second media content event to be presented in the future on the second user device during a second timeslot based at least in part on a content type of the second media content event, a length of the second media content event, and the first and second user information comprised in the user profile information;
   automatically presenting the first media content event on the first user device during the first timeslot; and
   automatically presenting the second media content event on the second user device during the second timeslot.

2. The method of claim 1, wherein at least one of the first and second user devices are portable media players.

3. The method of claim 1, wherein accessing the stored user profile information comprises accessing automatically generated user profile information.

4. The method of claim 1, wherein the user profile information includes at least one of a device availability sub-profile, a device connectivity sub-profile, and a device usage sub-profile.

5. The method of claim 1, further comprising:
   determining when the first user device will be connected; and
   scheduling delivery of the first media content event to the first user device based at least in part on the determining.

6. The method of claim 1, further comprising generating a media content event recommendations list based at least in part on at least one media source external to the first user device and the second user device.

7. The method of claim 1, wherein the first media content event is a video media content event and the second media content event is a non-video media content event.

8. The method of claim 1, further comprising presenting advertisements on at least one of the first user device and the second user device based on the user profile information.

9. The method of claim 1, further comprising updating the stored user profile information based on user interactions with one of the first and second user devices.

10. The method of claim 1, further comprising updating the stored user profile information based on automatically monitored user habits, preferences, or interactions.

11. The method of claim 1, further comprising:
    determining at least one media content format supported by the first user device;
    determining if the first media content associated with the first media content event is in the at least one supported media content format;
    in response to determining that the first media content is not in the at least one supported media content format, searching for an alternate version of the first media content in the at least one supported media content format; and
    in response to determining that no alternate version of the first media content can be found, transcoding the first media content into one of the at least one supported media content format.

12. The method of claim 1, further comprising:
    generating for display a list of scheduled media events including at least one user-scheduled event and at least one system-scheduled event; and
    receiving user input to change schedule information associated with at least one of the at least one user-scheduled event and the at least one system-scheduled event.

13. The method of claim 1, wherein:
    the user profile information comprises timeslot information of when the user most usually consumes the first media content and the second media content; and
    one of the first timeslot and the second timeslot is determined based on the timeslot information.

14. The method of claim 1, wherein:
    wherein the type of the first media content event is one of an audio asset and a video asset; and
    wherein the type of the second media content event is one of an audio asset and a video asset.

15. The method of claim 1, wherein:
wherein the type of the first media content event is one of a media asset recorded by the user, an on demand video asset, and a broadcast media asset; and
wherein the type of the second media content event is one of a media asset recorded by the user, an on demand media asset, and a broadcast media asset.

16. The method of claim 3 wherein the automatically generated user profile information is based, at least in part, on monitoring interactions of the user with at least one of the first user device and the second user device.

17. The method of claim 4, further comprising providing media content event recommendations based on at least one of the device availability sub-profile, the device connectivity sub-profile, and the device usage sub-profile.

18. The method of claim 6, wherein the at least one media source comprises at least one of web logs, online forums, news websites, review websites, and social networking websites.

19. The method of claim 12, wherein the list of scheduled media events is interactive.

20. The method of claim 12, wherein receiving the user input to change schedule information comprises changing a user device associated with at least one of the at least one user-scheduled event and the at least one system-scheduled event to a different user device.

21. The method of claim 12, wherein receiving the user input to change schedule information comprises changing the format of media content associated with at least one of the at least one user-scheduled event and the at least one system-scheduled event.

22. A system for scheduling media content presentation across multiple user devices, comprising:
a memory; and
processing circuitry configured to:
access stored user profile information in the memory, wherein the stored user profile information identifies a first user device and a second user device different than the first user device, wherein the stored user profile information comprises first user information on content types that a user favors at different timeslots and second user information on lengths that the user favors for each of the content types;
automatically schedule a first media content event to be presented in the future on the first user device during a first timeslot based at least in part on a content type of the first media content event, a length of the first media content event, and the first and second user information comprised in the user profile information;
automatically schedule a second media content event to be presented in the future on the second user device during a second timeslot based at least in part on a content type of the second media content event, a length of the second media content event, and the first and second user information comprised in the user profile information;
automatically present the first media content event on the first user device during the first timeslot; and
automatically present the second media content event on the second user device during the second timeslot.

23. The system of claim 22, wherein at least one of the first and second user devices are portable media players.

24. The system of claim 22, wherein accessing the stored user profile information comprises accessing automatically generated user profile information.

25. The system of claim 22, wherein the user profile information includes at least one of a device availability sub-profile, a device connectivity sub-profile, and a device usage sub-profile.

26. The system of claim 22, wherein the processing circuitry is further configured to:
determine when the first user device will be connected; and
schedule delivery of the first media content event to the first user device based at least in part on the determining.

27. The system of claim 22, wherein the processing circuitry is further configured to generate a media content event recommendations list based at least in part on at least one media source external to the first user device and the second user device.

28. The system of claim 22, wherein the first media content event is a video media content event and the second media content event is a non-video media content event.

29. The system of claim 22, wherein the processing circuitry is further configured to present advertisements on at least one of the first user device and the second user device based on the user profile information.

30. The system of claim 22, wherein the processing circuitry is further configured to update the stored user profile information based on user interactions with one of the first and second user devices.

31. The system of claim 22, wherein the processing circuitry is further configured to update the stored user profile information based on automatically monitoring user habits, preferences, or interactions.

32. The system of claim 22, wherein the processing circuitry is further configured to:
determine at least one media content format supported by the first user device;
determine if the first media content associated with the first media content event is in the at least one supported media content format;
in response to determining that the first media content is not in the at least one supported media content format, search for an alternate version of the first media content in the at least one supported media content format; and
in response to determining that no alternate version of the first media content can be found, transcode the first media content into one of the at least one supported media content format.

33. The system of claim 22, further comprising a user input device, wherein the processing circuitry is further configured to:
generate for display a list of scheduled media events including at least one user-scheduled event and at least one system-scheduled event; and
receive user input via the user input device to change schedule information associated with at least one of the at least one user-scheduled event and the at least one system-scheduled event.

34. The system of claim 22, wherein:
the user profile information comprises timeslot information of when the user most usually consumes the first media content and the second media content; and
one of the first timeslot and the second timeslot is determined based on the timeslot information.

35. The system of claim 22, wherein:
wherein the type of the first media content event is one of an audio asset and a video asset; and
wherein the type of the second media content event is one of an audio asset and a video asset.

36. The system of claim 22, wherein:
- wherein the type of the first media content event is one of a media asset recorded by the user, an on demand video asset, and a broadcast media asset; and
- wherein the type of the second media content event is one of a media asset recorded by the user, an on demand media asset, and a broadcast media asset.

37. The system of claim 24, wherein the automatically generated user profile information is based, at least in part, on monitoring interactions of the user with at least one of the first user device and the second user device.

38. The system of claim 25, wherein the processing circuitry is further configured to provide media content event recommendations based on at least one of the device availability sub-profile, the device connectivity sub-profile, and the device usage sub-profile.

39. The system of claim 27, wherein the at least one media source comprises at least one of web logs, online forums, news websites, review websites, and social networking websites.

40. The system of claim 33, wherein the list of scheduled media events is interactive.

41. The system of claim 33, wherein receiving the user input to change schedule information comprises changing a user device associated with at least one of the at least one user-scheduled event and the at least one system-scheduled event to a different user device.

42. The system of claim 33, wherein receiving the user input to change schedule information comprises changing format of media content associated with at least one of the at least one user-scheduled event and the at least one system-scheduled event.

* * * * *